(12) United States Patent
Hao et al.

(10) Patent No.: US 12,560,745 B2
(45) Date of Patent: Feb. 24, 2026

(54) HYBRID OPTICAL SYSTEM HAVING SUPERLENS AND REFRACTION AND/OR REFLECTION LENS

(71) Applicant: SHENZHEN METALENX TECHNOLOGY CO., LTD, Shenzhen (CN)

(72) Inventors: Chenglong Hao, Guangdong (CN); Fengze Tan, Guangdong (CN); Jian Zhu, Guangdong (CN)

(73) Assignee: Shenzhen Metalenx Technology Co., Ltd., Shenzhen (CN)

( * ) Notice: Subject to any disclaimer, the term of this patent is extended or adjusted under 35 U.S.C. 154(b) by 551 days.

(21) Appl. No.: 17/926,550

(22) PCT Filed: May 21, 2021

(86) PCT No.: PCT/CN2021/095122
§ 371 (c)(1),
(2) Date: Nov. 18, 2022

(87) PCT Pub. No.: WO2021/233416
PCT Pub. Date: Nov. 25, 2021

(65) Prior Publication Data
US 2023/0194760 A1 Jun. 22, 2023

(30) Foreign Application Priority Data
May 22, 2020 (CN) .......................... 202010443481.9

(51) Int. Cl.
*G02B 1/00* (2006.01)
*G02B 1/11* (2015.01)
(Continued)

(52) U.S. Cl.
CPC ............... *G02B 3/02* (2013.01); *G02B 1/002* (2013.01); *G02B 1/11* (2013.01); *G02B 27/0025* (2013.01);
(Continued)

(58) Field of Classification Search
CPC . G02B 3/02; G02B 1/002; G02B 1/11; G02B 27/0025; G02B 2207/101;
(Continued)

(56) References Cited

U.S. PATENT DOCUMENTS

| | | | |
|---|---|---|---|
| 11,815,703 B2 * | 11/2023 | Han | ..................... G02B 5/1809 |
| 12,061,347 B2 * | 8/2024 | Colburn | ............. G02B 27/4211 |

(Continued)

FOREIGN PATENT DOCUMENTS

| | | |
|---|---|---|
| CN | 104035188 | 9/2014 |
| CN | 105487145 | 4/2016 |

(Continued)

OTHER PUBLICATIONS

First Office Action issued in corresponding Chinese Application No. 202010443481.9 dated Mar. 25, 2022.

(Continued)

*Primary Examiner* — Bumsuk Won
*Assistant Examiner* — John Curtis Sipes
(74) *Attorney, Agent, or Firm* — Snell & Wilmer L.L.P.

(57) ABSTRACT

A metalens and an optical system having the metalens. The metalens includes: a substrate capable of transmitting light in different wavelength bands; and a plurality of unit cells on the same surface of the substrate. The multiple unit cells are arranged in an array, the unit cells are regular hexagons and/or squares. A center position of each unit cell or each of the center position and vertex positions of each unit cell is provided with a nanostructure. The nanostructures are symmetrically arranged with respect to a first axis and a second (Continued)

axis respectively, and partial nanostructures obtained by dividing the nanostructures on the metalens along the first axis and the second axis are identical to each other. The first axis is perpendicular to the second axis, and both the first axis and the second axis are perpendicular to a height direction of the nanostructures.

19 Claims, 20 Drawing Sheets

(51) Int. Cl.
| | | |
|---|---|---|
| *G02B 3/02* | (2006.01) | |
| *G02B 27/00* | (2006.01) | |
| *B82Y 20/00* | (2011.01) | |
| *B82Y 30/00* | (2011.01) | |

(52) U.S. Cl.
CPC .............. *B82Y 20/00* (2013.01); *B82Y 30/00* (2013.01); *G02B 2207/101* (2013.01)

(58) Field of Classification Search
CPC ........ G02B 5/1876; G02B 7/02; G02B 27/00; G02B 27/4211; G02B 3/00; G02B 7/021; B82Y 20/00; B82Y 30/00
See application file for complete search history.

(56) References Cited

U.S. PATENT DOCUMENTS

| | | | | |
|---|---|---|---|---|
| 2013/0250274 | A1* | 9/2013 | Kurokawa | .............. G01S 17/18 356/5.01 |
| 2016/0018628 | A1* | 1/2016 | Rowlette | ................ G02B 21/26 359/356 |
| 2017/0010488 | A1 | 1/2017 | Klug et al. | |
| 2017/0082263 | A1* | 3/2017 | Byrnes | .................... G02B 1/005 |
| 2019/0004281 | A1* | 1/2019 | Shi | ......................... G02B 7/021 |
| 2020/0096672 | A1 | 3/2020 | Yu et al. | |
| 2020/0217796 | A1* | 7/2020 | Kim | ........................... G01J 3/44 |
| 2020/0355913 | A1* | 11/2020 | Park | ....................... G02B 1/002 |
| 2020/0393599 | A1* | 12/2020 | Fu | ......................... G02B 3/0012 |
| 2020/0409142 | A1* | 12/2020 | Feng | ...................... G02B 7/021 |
| 2021/0018715 | A1* | 1/2021 | Fujii | ...................... G02B 13/18 |
| 2021/0055626 | A1* | 2/2021 | Jeong | ......................... G02F 1/29 |
| 2021/0068665 | A1* | 3/2021 | Pahlevaninezhad ... G02B 1/002 |
| 2021/0231909 | A1* | 7/2021 | Colburn | .................. G02B 7/10 |

FOREIGN PATENT DOCUMENTS

| | | |
|---|---|---|
| CN | 109196387 | 1/2019 |
| CN | 110376665 | 10/2019 |
| CN | 110476090 | 11/2019 |
| CN | 110609386 | 12/2019 |
| CN | 111257975 | 6/2020 |
| CN | 111913241 | 11/2020 |
| CN | 213092332 | 4/2021 |
| JP | 2012230246 | 11/2012 |

OTHER PUBLICATIONS

Second Office Action issued in corresponding Chinese Application No. 202010443481.9 dated Aug. 22, 2022.

Third Office Action issued in corresponding Chinese Application No. 202010443481.9 dated Dec. 2, 2022.

International Search Report issued in corresponding International Application No. PCT/CN2021/095122 dated Aug. 11, 2021.

* cited by examiner

HYBRID OPTICAL SYSTEM HAVING SUPERLENS AND REFRACTION AND/OR REFLECTION LENS

CROSS-REFERENCE TO RELATED APPLICATIONS

This application is a U.S. national stage entry under 35 U.S.C. § 371 of International Application No. PCT/CN2021/095122 filed May 21, 2021, entitled "HYBRID OPTICAL SYSTEM HAVING SUPERLENS AND REFRACTION AND/OR REFLECTION LENS," which claims priority to, and the benefit of, Chinese Patent Application Serial No. 202010443481.9, filed on May 22, 2020. Each of the foregoing applications are hereby incorporated by reference in their entirety (except for any subject matter disclaimers or disavowals, and except to the extent of any conflict with the disclosure of the present application, in which case the disclosure of the present application shall control).

FIELD

The present disclosure relates to the field of lenses, in particular to a metalens and an optical system with the metalens.

BACKGROUND

An optical lens, as a basic component, has crucial functions in the scientific and industrial fields such as imaging, precision measurement and optical communication. A conventional optical lens is manufactured by complex procedures including cutting material, polishing surface, fine polishing, coating film. A multi-lens optical system is formed by multiple refracting lenses or reflecting lenses to realize a specific imaging application, such as infinite imaging, image projection and microscopic imaging. In general, existing multi-lens optical systems formed by refracting lenses or reflecting lenses have disadvantages of large volume and heavy weight.

SUMMARY

In view of the above technical problems, a metalens and an optical system with the metalens are provided according to embodiments of the present disclosure.

A metalens is provided according to a first aspect of the embodiments of the present disclosure. The metalens includes: a substrate and a plurality of unit cells. The substrate is configured to transmit light of different wavebands including visible light and infrared light. The unit cells are arranged in an array on one surface of the substrate. Each of the structure units is regular hexagonal or square, with one nanostructure at a center of each unit cell, or with nanostructures each arranged at the center and vertexes of each metasurface structure. The nanostructures are symmetrically arranged with respect to a first axis and a second axis, and partial nanostructures obtained by dividing the nanostructures on the metalens along the first axis and the second axis are identical to each other, where the first axis is perpendicular to the second axis, and both the first axis and the second axis are perpendicular to a height direction of the nanostructures. The nanostructures at different positions of the metalens have different optical phases at different wavelengths. As for each wavelength, the optical phase distribution of metalens is determined by the different optical phase of nanostructures at different positions.

In an embodiment, each of the nanostructures is a nanopillar, and the nanopillar is one of a negative hollow nanopillar, a square nanopillar, a negative square nanopillar, a hollow square nanopillar, a negative hollow square nanopillar and a topological nanopillar.

In an embodiment, the optical phase of the nanostructure is related to a height of the nanopillar, a shape of a cross section of the nanopillar and a material of the nanopillar. The cross section is parallel to the substrate.

In an embodiment, the nanostructures are made of one of the following materials:

photoresist, quartz glass, silicon nitride, titanium oxide, crystalline silicon, amorphous silicon, and gallium nitride.

An optical system is provided according to a second aspect of the embodiments of the present disclosure. The optical system includes: a lens cone; a lens; and at least one metalens according to any one of the first aspect of the present disclosure. The lens and the metalens are coaxially arranged in the lens cone, where the metalens possesses different optical phase at different wavelengths to correct aberrations of the lens at a predetermined wavelength.

In an embodiment, the aberration includes at least one of a spherical aberration, a coma aberration, astigmatism, field curvature, distortion, a positional aberration, and a magnification aberration.

In an embodiment, the lens includes at least one of a refracting lens and a reflecting lens.

In an embodiment, the lens includes one refracting lens and the metalens consists of two metalenses, for which the refracting lens and the two metalenses are spaced apart from each other.

In an embodiment, the metalens includes a first metalens and a second metalens, the second metalens is arranged between the first metalens and the refracting lens, and an incident light sequentially passes through the first metalens and the second metalens and enters into the refracting lens.

In an embodiment, the refracting lens is a convex lens coated with a first antireflection coating designed for a visible waveband. The substrate of the metalens includes a first surface. A portion of the first surface without nanostructure is coated with a second antireflection coating designed for the visible waveband. An outer surface of the nanostructures of the metalens is coated with a third antireflection coating designed for the visible waveband. The first surface of the substrate of the metalens refers to a side of the substrate with the nanostructures.

In an embodiment, the refracting lens is made of optical glass; and/or the substrate of the metalens is made of quartz glass; and/or the nanostructures of the metalens are made of one of silicon nitride, titanium oxide, gallium nitride and silicon dioxide.

In an embodiment, the second antireflection coating designed for the visible waveband matches with quartz glass in refractive index; and/or the third antireflection coating designed for the visible waveband matches with the nanostructures in refractive index.

In an embodiment, the refracting lens is a convex lens coated with a first antireflection coating designed for a far-infrared waveband. The substrate of the metalens includes a first surface. A portion of the first surface without nanostructure is coated with a second antireflection coating designed for the far-infrared waveband, a top surface of the nanostructures of the metalens is coated with a third antireflection coating designed for the far-infrared waveband, and the first surface of the substrate of the metalens refers to a side of substrate with the nanostructures.

In an embodiment, the refracting lens is made of one of monocrystalline germanium, zinc sulfide, zinc selenide and chalcogenide glass; and/or the substrate of the metalens and the nanostructures of the metalens are made of crystalline silicon.

In an embodiment, the second antireflection coating and the third antireflection coating both designed for the far-infrared waveband match with the crystalline silicon in refractive index.

In an embodiment, the lens includes two reflecting lenses, the metalens consists of two metalenses, and the two reflecting lenses and the two metalenses are spaced apart from each other.

In an embodiment, the reflecting lens includes a primary reflecting lens and a secondary reflecting lens, and the metalens includes a third metalens and a fourth metalens; wherein the primary reflecting lens is set between the secondary reflecting lens and the third metalens, and the primary reflecting lens is spaced apart from the secondary reflecting lens. The fourth metalens is arranged at a side of the third metalens away from the primary reflecting lens and is spaced apart from the third metalens;

the primary reflecting lens includes two sub-reflecting lenses spaced apart from each other in a direction perpendicular to a third axis; each of the two sub-reflecting lenses is a concave lens; the two sub-reflecting lenses are symmetrically arranged with respect to the third axis; and the primary reflecting lens, the secondary reflecting lens, the third metalens and the fourth metalens are arranged coaxially with each other along the third axis;

the secondary reflecting lens is a convex lens; the convex surface of the secondary reflecting lens faces a surface of the third metalens having the nanostructures; and a surface of the fourth metalens having the nanostructures faces a substrate of the third metalens; and incident light is reflected by the concave surfaces of the two sub-reflecting lenses onto the convex surface of the secondary reflecting lens, and is reflected by the secondary reflecting lens, then sequentially passes through the third metalens and the fourth metalens and then is output.

It can be seen from the above technical solutions according to the embodiments of the present disclosure, the partial nanostructures obtained by dividing the nanostructures on the metalens along the first axis and the second axis are identical to each other, therefore, the metalens is insensitive to the polarization of incident light. Compared with conventional lens, the metalens is much thinner and lighter. In addition, the optical phase of the metalens according to the present disclosure changes with wavelength, which can correct the aberration of the conventional lens.

In addition, the optical system including conventional lens and metalens according to the present disclosure is capable of wide-angle imaging in a wide waveband. Compared with conventional optical systems, the optical system according to the present disclosure shows advantages of a small volume and light weight.

It should be understood that, the foregoing general descriptions and the following detailed descriptions are merely for exemplary and explanatory purposes and are not intended to limit the present disclosure.

Figure 1A:
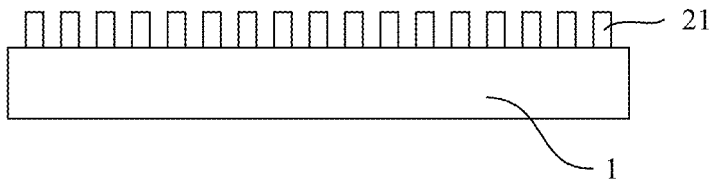
FIG. 1A is a schematic diagram of a metalens according to an embodiment of the present disclosure.

| Reference numbers in the drawings are listed as follows: | | | |
| --- | --- | --- | --- |
| 100 | lens; | 110 | refracting lens; |
| 120 | primary reflecting lens; | 130 | secondary reflecting lens; |
| 200 | metalens; | 210 | first metalens; |
| 220 | second metalens | 230 | third metalens; |
| 240 | fourth metalens; | 1 | substrate; |
| 2 | unit cell; | 21 | nanostructure; |
| 211 | positive nanopillar; | 212 | negative nanopillar; |
| 2121 | first column; | 2122 | first hollow part; |
| 213 | hollow nanopillar; | 2131 | second cylinder; |
| 2132 | second hollow part; | 214 | negative hollow nanopillar; |
| 2141 | second column; | 2412 | third hollow part; |
| 2143 | third cylinder; | 215 | square nanopillar; |
| 216 | negative square nanopillar; | 2161 | fourth column; |
| 2162 | fourth hollow part; | 217 | hollow square nanopillar; |
| 2171 | fifth column; | 2172 | fifth hollow part; |

| Reference numbers in the drawings are listed as follows: | | | |
| --- | --- | --- | --- |
| 218 | negative hollow square nanopillar; | 2181 | sixth column; |
| 2182 | sixth hollow part; | 2183 | seventh column; |
| 219 | topological nanopillar. | | |

DETAILED DESCRIPTION OF THE EMBODIMENTS

Exemplary embodiments are described in detail herein, and examples thereof are shown in the drawings. When the following descriptions refers to the drawings, unless indicated otherwise, same numbers in different drawings represent the same or similar elements. The implementations described in the following exemplary embodiments do not represent all implementations that are consistent with the present disclosure. On the contrary, the implementations are merely examples of devices and methods consistent with those described in detail in the claims and some aspects of the present disclosure.

Terms used in the present disclosure are only used for describing specific embodiments rather than limiting the present disclosure. The terms "one", "said", and "the" in a singular form used in the present disclosure and the claims are intended to include a plural form unless other meanings are clearly indicated in the context. It should be understood that the terms "and/or" as used herein refer to and include any or all possible combinations of one or more associated listed items.

It should be understood that although the terms such as first, second and third may be used to describe various kinds of information in the present disclosure, such information should not be limited to these terms. The terms are only intended to distinguish the same type of information from each other. For example, first information may be referred as second information, similarly, the second information may be referred as the first information without departing from the scope of the present disclosure. Depending on the context, a word "if" as used herein may be interpreted as "in a case that" or "when" or "in response to a determination". The embodiments and features in the embodiments may be combined with each other without a conflict.

The optical system composed of several conventional optical lenses has some disadvantages, such as high requirements on assembly and alignment, low efficiency for light energy utilization due to aberration correction for optical system, a large volume and heavy weight, and complicated system. Although a planar diffractive lens may reduce the volume and weight to a certain extent, a cross section in wavelength level makes it difficult to realize accurate phase distribution, failing to meet the requirements of high resolution.

Optical metasurface is rapidly emerging and becomes a mainstream way in miniaturization and planarization optics. Optical phase distribution of a conical lens, a blazed grating, a polarizer, a holographic dry plate, and a planar lens has been achieved based on the metasurface. Ascribed to continuous phase change from 0 to 2π, a single-layer aplanat metalens has also been realized. In addition, doublet metasurface can correct all monochromatic aberrations.

A metalens is provided according to an embodiment of the present disclosure. The metalens includes a substrate and a plurality of unit cells. The substrate is configured to transmit light of different wavebands including visible light and infrared light. The a plurality of unit cells are arranged in an array on one surface of the substrate. Each of the unit cells is regular hexagonal or square, a center of each unit cell is provided with one nanostructure, or each of the center and vertexes of each unit cell is provided with one nanostructure. The nanostructures are symmetrically arranged with respect to a first axis and a second axis. Partial nanostructures obtained by dividing the nanostructures on the metalens along the first axis and the second axis are identical to each other. The first axis is perpendicular to the second axis, and the first axis and the second axis are both perpendicular to a height direction of the nanostructures. An optical phase of the nanostructure changes with its position on the metalens and a wavelength, so as to define optical phase distribution of the metalens at different wavelengths. In the present disclosure, the partial nanostructures obtained by dividing the nanostructures on the metalens along the first axis and the second axis are identical to each other, therefore, the metalens is insensitive to the polarization of incident light. Compared with the conventional lens, the metalens has a small thickness and light weight. In addition, the optical phase of the metalens according to the present disclosure is changeable at different wavelengths, which can correct the aberration of the conventional lens.

An optical system is further provided according to an embodiment of the present disclosure. The optical system includes a lens cone, a lens and at least one metalens according to any one of the first aspect of the present disclosure. The lens and the metalens are coaxially arranged in the lens cone, and an optical phase of the metalens is changeable at different wavelengths, so as to correct an aberration of the lens at the corresponding wavelength. The optical system according to the present disclosure includes the conventional lens and the metalens and is capable of imaging at a wide waveband and wide-angle. Compared with the conventional optical system, the optical system according to the present disclosure has a small volume and light weight.

Exemplary embodiments are described in detail below, and examples thereof are shown in the drawings.

First Embodiment

Figure 1B:
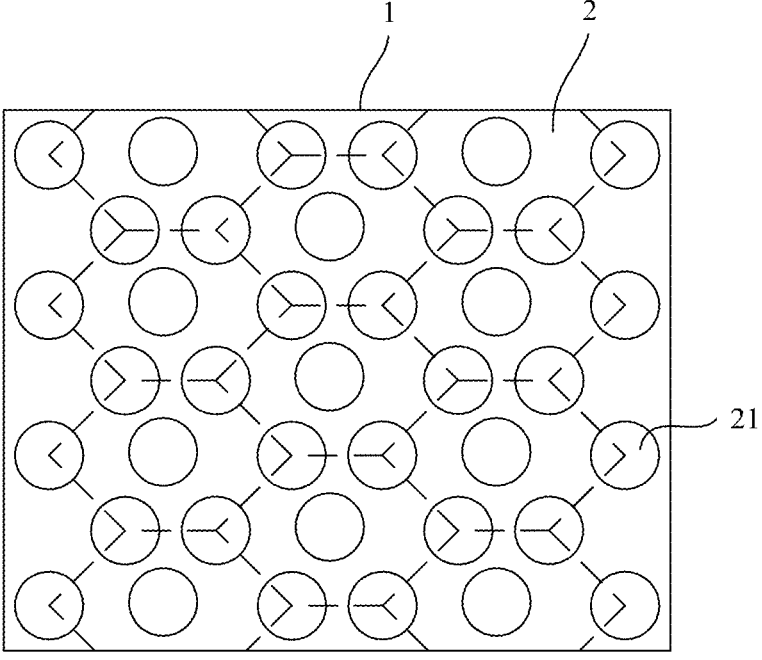
FIG. 1B is a diagram showing a metalens having nano-structures arranged in a regular hexagonal pattern according to an embodiment of the present disclosure.
Figure 1C:
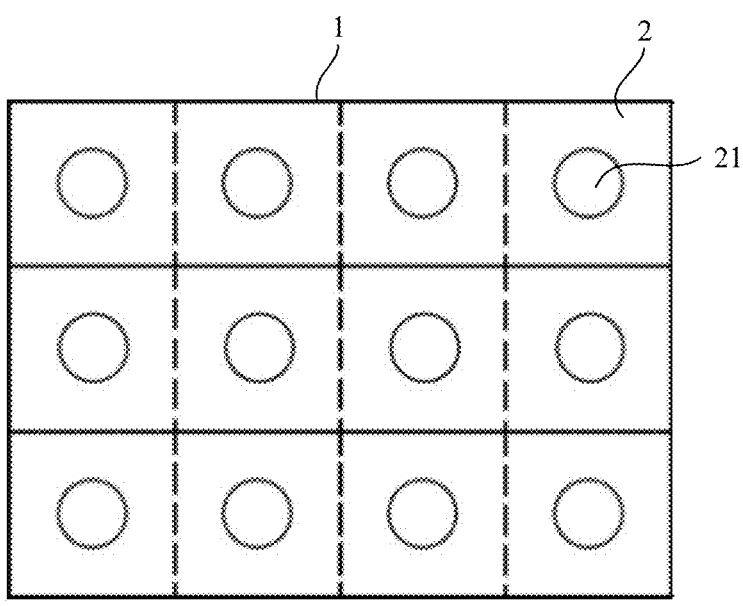
FIG. 1C is a diagram showing the metalens having the nanostructures arranged in a square pattern according to an embodiment of the present disclosure.

A metalens is provided according to an embodiment of the present disclosure. As shown in FIGS. 1A, 1B and 1C, the metalens 200 may include a substrate 1 and a plurality of unit cells 2 arranged on one surface of the substrate 1. The substrate 1 is capable of transmitting light of different wavebands. In the present disclosure, the different wavebands includes visible light, infrared light and other light. For example, visible light transmitted by the substrate 1 possesses wavelength greater than or equal to 40 nm (in nanometers) and less than or equal to 700 nm. For example, infrared light transmitted by the substrate 1 possesses wavelength greater than or equal to 8 μm (in microns) and less than or equal to 12 μm.

The unit cells 2 are arranged in an array. Each unit cell 2 is regular hexagonal or square. For example, as shown in FIG. 1C, a center of each unit cell 2 is provided with one nanostructure 21, with this arrangement, a metalens 200 with a minimum number of nanostructures 21 can be formed, while the performance of the metalens 200 meets the requirements. For example, as shown in FIG. 1B, each of vertexes and a center of each unit cell 2 is provided with one nanostructure 21.

For example, in some embodiments, as shown in FIG. 1B, all the unit cells 2 are regular hexagonal. In other embodiments, as shown in FIG. 1C, all the unit cells 2 are square. In other embodiments, the unit cells 2 include regular hexagonal array units and square unit cells. It should be understood that in other embodiments, the unit cell 2 may also be shaped as other regular polygons.

In the embodiment, the nanostructures 21 on metalens 200 are symmetrically arranged with respect to a first axis and a second axis. Partial nanostructures obtained by dividing the nanostructures 21 on metalens 200 along the first axis and the second axis are identical to each other. This kind of structure is insensitive to the polarization state of the incident light. The first axis is perpendicular to the second axis, and both the first axis and the second axis are perpendicular to a height direction of the nanostructures 21 on metalens 200. It should be noted that the first axis and the second axis pass through a center of the nanostructures 21 on metalens 200 and are parallel to a horizontal plane.

In the embodiment, for each of the nanostructures 21 at a certain position, an optical phase of the nanostructure 21 changes with wavelengths, so as to define the optical phase distribution of the metalens 200 at different wavelengths, thus forming the metalens 200 adapted to a wide waveband. It should be noted that an overall structure formed by the nanostructures 21 according to the embodiment of the present disclosure is able to transmit the visible light and the infrared light at the same time, and is also able to transmit lights of other different wavebands.

For example, a thickness of the substrate 1 is greater than or equal to 0.1 mm (in millimeters) and less than 2 mm. For example, the thickness of the substrate 1 may be 0.1 mm, 0.5 mm, 1 mm, 1.5 mm, 2 mm, or the like.

A thickness of the overall structure formed by the plurality of the nanostructures 21 according to the embodiment is in a micron level. Therefore, the nanostructures 21 on the substrate 1 may approximately assumed as a planar structure. In an embodiment, the thickness of the overall structure formed by the plurality of nanostructures 21 is less than or equal to 50 μm (in micrometers), such as 1.5 μm, 5 μm, 10 μm, 1.5 μm, 20 μm, 25 μm, 30 μm, 35 μm, 40 μm, 45 μm or 50 μm. In an embodiment, the thickness of the overall structure formed by the plurality of nanostructures 21 is in the same order of magnitude as an operating wavelength of a hybrid system. In addition, it should be noted that, in the embodiment of the present disclosure, the thickness of the metalens 200 is a sum of the thickness of the substrate 1 and the overall structure formed by the plurality of nanostructures 21. It should be noted that the substrate 1 is configured to support the plurality of nanostructures 21. The material of the substrate 1 may be the same or different from the material of the nanostructures 21.

For example, the substrate 1 may be made of quartz glass or crystalline silicon. It should be understood that the substrate 1 may also be made of other materials.

For example, the nanostructure 21 may be made of one of the following materials: photoresist, quartz glass, silicon nitride, titanium oxide, crystalline silicon (including crystalline silicon and amorphous silicon), and gallium nitride. It should be understood that the nanostructures 21 may also be made of other materials.

In addition, in the embodiment of the present disclosure, a shape of the metalens 200 depends on a shape of the substrate 1. The substrate 1 may be in a regular shape such as a circle, a square and a regular polygon, or may be in an irregular shape. For example, the substrate 1 is circular, thus the metalens 200 is circular. For example, the substrate 1 is square, thus the metalens 200 is square.

The nanostructures 21 may be shaped as a nanopillar or have another structure symmetrically arranged with respect to a horizontal axis and a vertical axis.

The following example is intended to describe the nanostructures 21 shaped as a nanopillar. It should be understood that in a case that the nanostructure 21 is in another structure, the nanopillar in the following embodiment may be replaced with the other structure.

The nanopillar may include at least one of a positive nanopillar, a negative nanopillar, a hollow nanopillar, a negative hollow nanopillar, a square nanopillar, a negative square nanopillar, a hollow square nanopillar a negative hollow square nanopillar, and a topological nanopillar. For example, the nanopillar may be one of the positive nanopillar, the negative nanopillar, the hollow nanopillar, the negative hollow nanopillar, the square nanopillar, the negative square nanopillar, the hollow square nanopillar, the negative hollow square nanopillar, and the topological nanopillar, which is convenient for processing.

In the embodiment of the present disclosure, the optical phase of the nanostructures 21 is related to a height of the nanopillar, a shape of a cross section of the nanopillar and a material of the nanopillar. The cross section of the nanopillar is parallel to the substrate 1.

As shown in FIGS. 2A to 2I, the height of the nanopillar (that is, the height of the nanopillar in a z-direction) is H.

In a case that the overall structure formed by the plurality of nanostructures 21 is to transmit visible light, the height H of the nanopillar is greater than or equal to 300 nm and less than or equal to 1500 nm, an interval between adjacent nanopillars (that is, an interval between centers of the two adjacent nanopillars) is greater than or equal to 300 nm and less than or equal to 650 nm, and a minimum size of the nanostructures (that may be a diameter, a side length, and/or a minimum interval between two adjacent nanopillars, or the like) may be 40 nm. For example, the height H of the nanopillar is 300 nm, 400 nm, 500 nm, 600 nm, 700 nm, 800 nm, 900 nm, 1000 nm, 1100 nm, 1200 nm, 1300 nm, 1400 nm, 1500 nm, or the like. For example, the interval between adjacent nanopillars is 300 nm, 350 nm, 400 nm, 450 nm, 500 nm, 550 nm, 600 nm, 650 nm, or the like.

In a case that the overall structure formed by the plurality of nanostructures 21 is to transmit infrared light of wavebands of 8 μm to 12 μm, the height H of the nanopillar is greater than or equal to 5 μm and less than or equal to 50 μm, the interval between adjacent nanopillars is greater than or equal to 1.5 μm and less than or equal to 5 μm, and the minimum size (that may be a diameter, a side length, and/or a minimum interval between two adjacent nanopillars, or the like) of the nanostructure may be 40 nm. For example, the height H of the nanopillar is 5 μm, 10 μm, 15 μm, 20 μm, 25 μm, 30 μm, 35 μm, 40 μm, 45 μm, 50 μm or the like. For example, the interval between adjacent nanopillars is 1.5 μm, 2 μm, 2.5 μm, 3 μm, 3.5 μm, 4 μm, 4.5 μm, 5 μm, or the like.

Figure 2A:
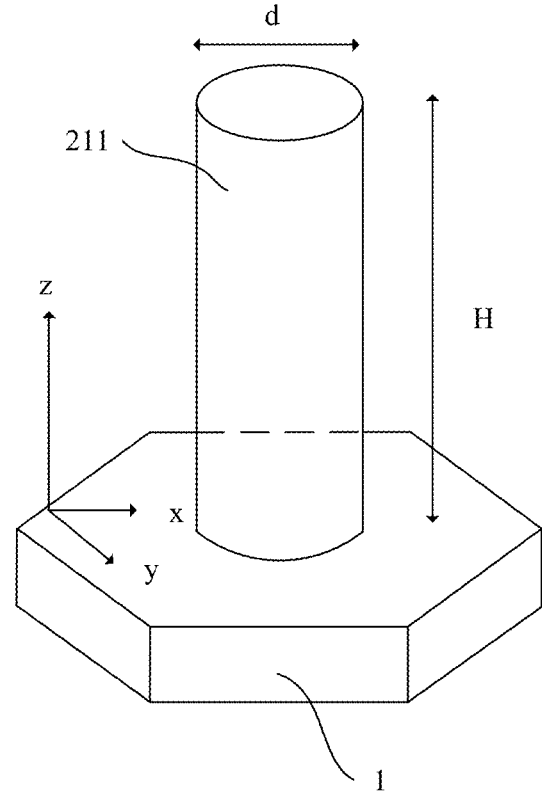
FIG. 2A is a schematic diagram of a positive nanopillar according to an embodiment of the present disclosure.

As shown in FIG. 2A, the positive nanopillar 211 may include a first cylinder. The first cylinder is in a solid structure. The positive nanopillar 211 has a cross section of a diameter d on a x-y plane. The diameter d ranges from 40 nm to 400 nm. For example, the diameter d may be set as 40 nm, 50 nm, 150 nm, 200 nm, 250 nm, 300 nm, 350 nm, 400 nm or the like.

Figure 2B:
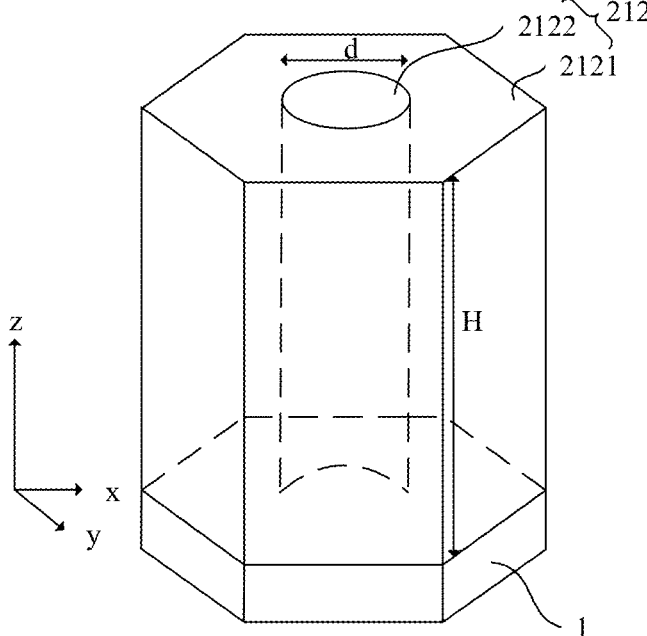
FIG. 2B is a schematic diagram of a negative nanopillar according to an embodiment of the present disclosure.

As shown in FIG. 2B, the negative nanopillar 212 may include a first column 2121. A shape of a cross section of the first column 2121 is the same as a shape of the unit cell 2. For example, in a case that the unit cell 2 is hexagonal, the cross section of the first column 2121 is hexagonal. In a case that the unit cell 2 is square, the cross section of the first column 2121 is square. In the embodiment, a size of the cross section of the first column 2121 is the same as a size of the unit cell 2. The first column 2121 is provided with a first hollow part 2122 which is cylindrical and extends from a top of the first column 2121 to a bottom of the first column 2121, and the first column 2121 is coaxial with the first hollow part 2122. The negative nanopillar 212 has a cross section of a diameter d on the x-y plane (that is, the cross section). The diameter d ranges from 40 nm to 400 nm. For example, the diameter d may be set as 40 nm, 50 nm, 150 nm, 200 nm, 250 nm, 300 nm, 350 nm, 400 nm or the like.

Figure 2C:
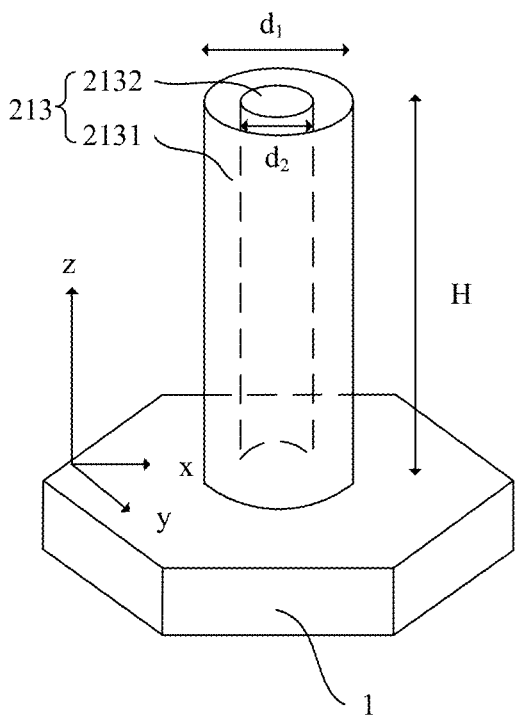
FIG. 2C is a schematic diagram of a hollow nanopillar according to an embodiment of the present disclosure.

As shown in FIG. 2C, the hollow nanopillar 213 may include a second cylinder 2131. The second cylinder 2131 is provided with a cylindrical second hollow part 2132 extending from a top of the second cylinder 2131 to a bottom of the second cylinder 2131, and the second cylinder 2131 is coaxial with the second hollow part 2132. The hollow nanopillar 213 has a cross section of an outer diameter $d_1$ and an inner diameter of $d_2$ on the x-y plane. $d_1$-$d_2$ ranges from 40 nm to 400 nm. For example, $d_1$-$d_2$ may be set as 40 nm, 50 nm, 150 nm, 200 nm, 250 nm, 300 nm, 350 nm, 400 nm or the like.

Figure 2D:
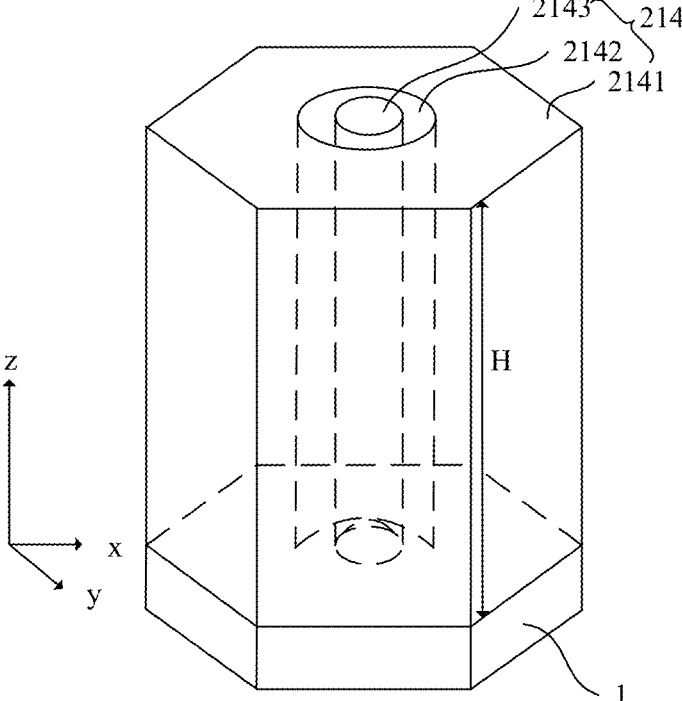
FIG. 2D is a schematic diagram of a negative hollow nanopillar according to an embodiment of the present disclosure.

As shown in FIG. 2D, the negative hollow nanopillar 214 may include a second column 2141. A shape of a cross section of the second column 2141 is the same as a shape of the unit cell 2. For example, in a case that the unit cell 2 is hexagonal, the cross section of the second column 2141 is hexagonal. In a case that the unit cell 2 is square, the cross section of the second column 2141 is square. In the embodiment, a size of the cross section of the second column 2141 is the same as the size of the unit cell 2. Further, the second column 2141 is provided with a cylindrical third hollow part 2142 extending from the top of the second column 2141 to the bottom of the second column 2141. Further, the third hollow part 2142 is internally provided with a third cylinder 2143. The third cylinder 2143 is in a solid structure. The second column 2141, the third hollow part 2142 and the third cylinder 2143 are coaxial with each other. In addition, a height of the second column 2141 is equal to the height of the third cylinder 2143, and the bottom of the third cylinder 2143 is attached to the substrate 1.

Figure 2E:
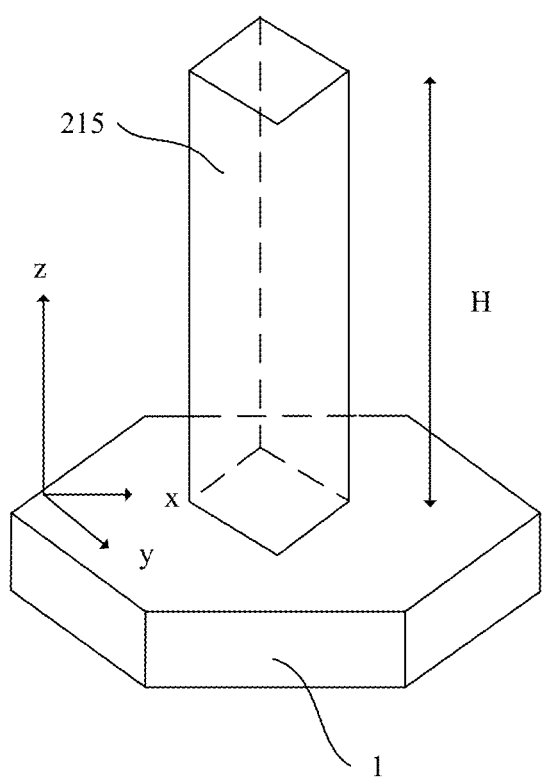
FIG. 2E is a schematic diagram of a square nanopillar according to an embodiment of the present disclosure.

As shown in FIG. 2E, the square nanopillar 215 may include a third column. The third column is in a solid structure, and a cross section of the third column is square.

Figure 2F:
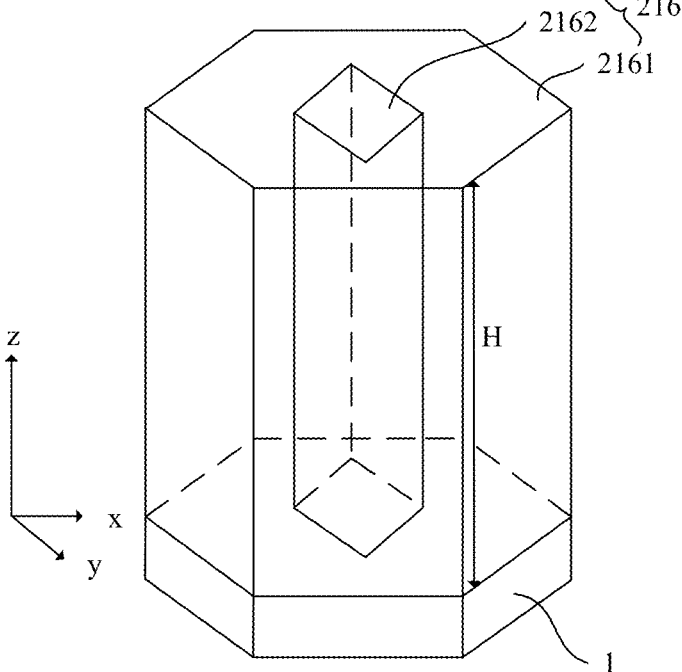
FIG. 2F is a schematic diagram of a negative square nanopillar according to an embodiment of the present disclosure.

As shown in FIG. 2F, the negative nanopillar 216 may include a fourth column 2161. A shape of a cross section of the fourth column 2161 is the same as the shape of the unit cell 2. For example, in a case that the unit cell 2 is hexagonal, the cross section of the fourth column 2161 is hexagonal. In a case that the unit cell 2 is square, the cross section of the fourth column 2161 is square. In the embodiment, a size of the cross section of the fourth column 2161 is the same as the size of the unit cell 2. Further, the fourth column 2161 is provided with a fourth hollow part 2162 extending from the top of the fourth column 2161 to the bottom of the fourth column 2161. A cross section of the fourth hollow part 2162 is square, and the fourth column 2161 is arranged coaxially with the fourth hollow part.

Figure 2G:
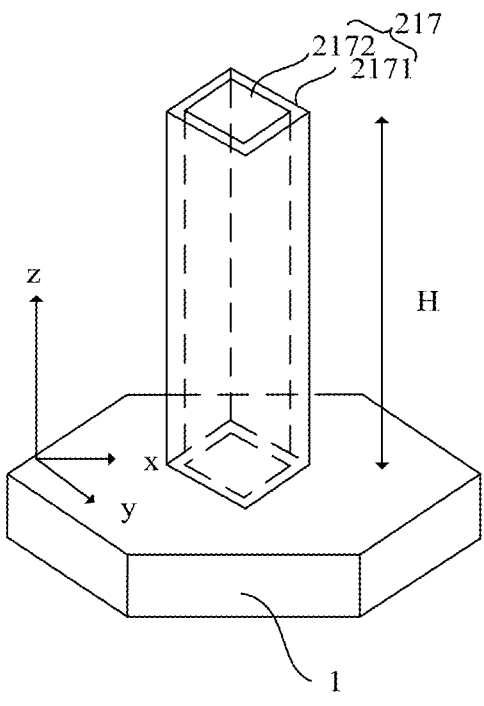
FIG. 2G is a schematic diagram of a hollow square nanopillar according to an embodiment of the present disclosure.

As shown in FIG. 2G, the hollow square nanopillar 217 may include a fifth column 2171. A cross section of the fifth column 2171 is square. Further, the fifth column 2171 is provided with a fifth hollow part 2172 extending from the top of the fifth column 2171 to the bottom of the fifth column 2171. A cross section of the fifth hollow part 2172 is square. In addition, the fifth column 2171 is coaxial with the fifth hollow part 2172. On a same cross section, diagonal lines of a square corresponding to the fifth column 2171 are respectively collinear with diagonal lines of a square corresponding to the fifth hollow part 2172.

Figure 2H:
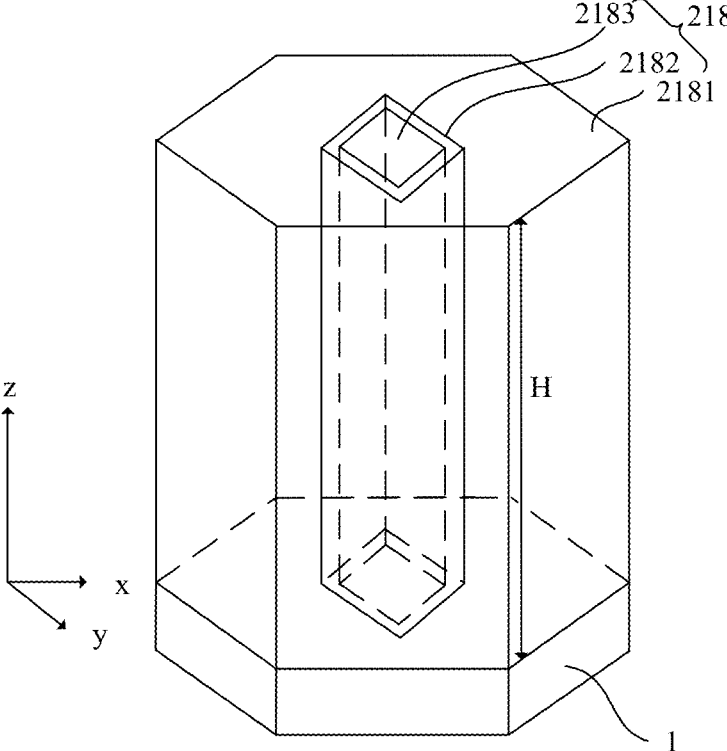
FIG. 2H is a schematic diagram of a negative hollow square nanopillar according to an embodiment of the present disclosure.

As shown in FIG. 2H, the negative hollow nanopillar 218 may include a sixth column 2181. A shape of a cross section of the sixth column 2181 is the same as the shape of the unit cell 2. For example, in a case that the unit cell 2 is hexagonal, the cross section of the sixth column 2181 is hexagonal. In a case that the unit cell 2 is square, the cross section of the sixth column 2181 is square. In the embodiment, a size of the cross section of the sixth column 2181 is the same as the size of the unit cell 2. Further, the sixth column 2181 is provided with a sixth hollow part 2182 extending from the top of the sixth column 2181 to the bottom of the sixth column 2181. A cross section of the sixth hollow part 2182 is square. The sixth hollow part 2182 is internally provided with a seventh column 2183. The seventh column 2183 is in a solid structure, and a cross section of the seventh column 2183 is square. In the embodiment, the sixth column 2181, the sixth hollow part 2182 and the seventh column 2183 are coaxial with each other. In addition, on a same cross section, diagonal lines of a square corresponding to the seventh column 2183 are respectively collinear with diagonal lines of a square corresponding to the sixth hollow part 2182.

Figure 2I:
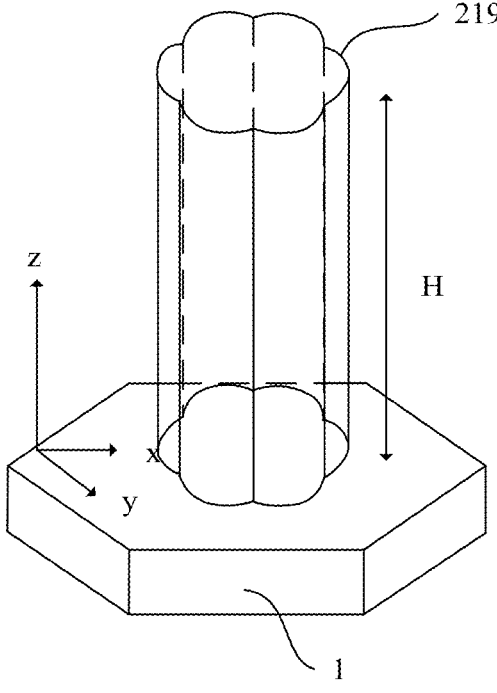
FIG. 2I is a schematic diagram of a topological nanopillar according to an embodiment of the present disclosure.

As shown in FIG. 2I, the topological nanopillar 219 may include an eighth column. The eighth column is in a solid structure. A cross section of the eighth column is a polygon, and edges of the polygon are arc-shaped.

The nanopillar is manufactured on the substrate 1 by one of the following processes: high-speed laser direct writing process for large diameter, a photolithography process and a nanoimprint lithography process. The processes of the present disclosure are not limited to the above ways. The implementation of manufacturing the nanopillars on the substrate 1 by the above processes are described in detail in the following embodiments.

Figure 3A:
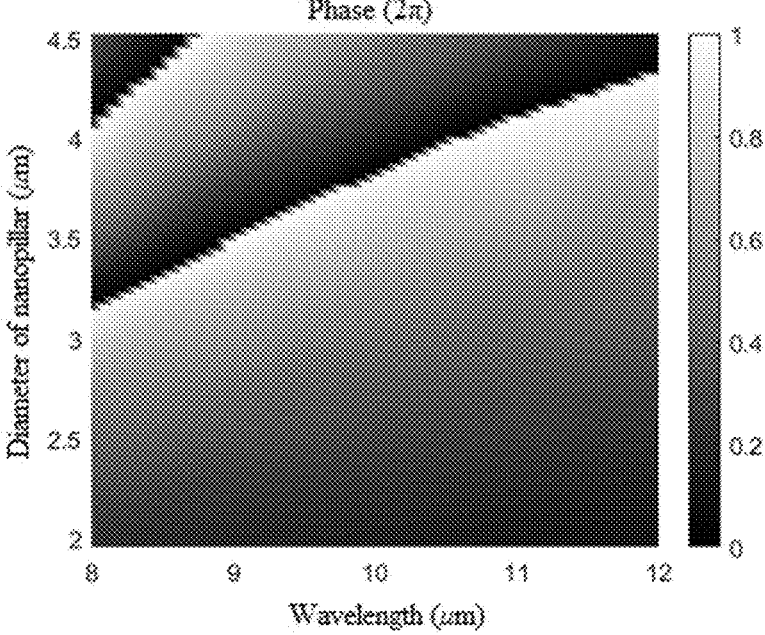
FIG. 3A is a diagram showing a relationship between an optical phase and a diameter of a nanopillar made of crystalline silicon at operating wavelengths of 8 µm to 12 µm according to an embodiment of the present disclosure.

For example, in some embodiments, the nanopillar is a circular nanopillar. For the metalens 200 in the hybrid optical system designed to operate in far-infrared waveband, a central wavelength of the far-infrared waveband is 10 μm, the circular nanopillar is made of crystalline silicon, the positive nanopillar 211 is as shown in FIG. 2A, the height H of the positive nanopillar 211 is 11.25 μm, and a side length of a basic element of regular hexagon is 2.76 μm. FIG. 3A shows a relationship between an optical phase of the metalens 200 and a diameter of the positive nanopillar 211 in a case that the central wavelength of the far-infrared waveband is 10 μm. In FIG. 3A, the abscissa represents the operating wavelength (ranging from 8 μm to 12 μm), and the ordinate represents the diameter of the positive nanopillar 211.

Figure 3B:
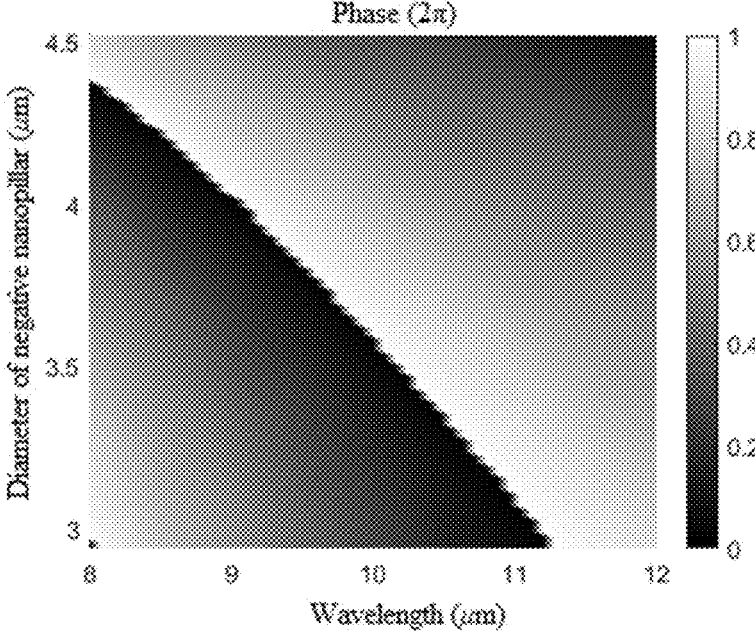
FIG. 3B is a diagram showing a relationship between an optical phase and a diameter of a negative nanopillar made of crystalline silicon at operating wavelengths of 8 µm to 12 µm according to an embodiment of the present disclosure.

In some embodiments, the nanopillar 21 is a negative circular nanopillar. For the metalens 200 in the hybrid optical system designed to operate in far-infrared waveband, the central wavelength of the far-infrared waveband is 10 μm, the negative circular nanopillar is made of crystalline silicon, the negative circular nanopillar is as shown in FIG. 2B, the height H of the negative nanopillar 212 is 11.25 μm, and a side length of a basic element of regular hexagon is 2.76 μm. FIG. 3B shows a relationship between an optical phase of the metalens 200 and a diameter of the negative nanopillar 212 in a case that the central wavelength of the far-infrared waveband is 10 μm. In FIG. 3B, the abscissa represents the operating wavelength (ranging from 8 μm to 12 μm), and the ordinate represents the diameter of the negative nanopillar 212.

Figure 3C:
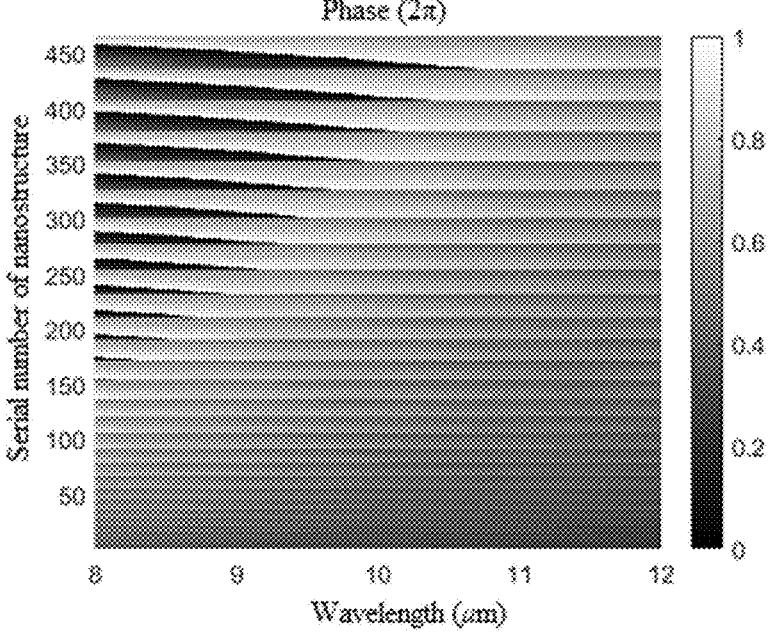
FIG. 3C is a diagram showing a relationship between an optical phase and a serial number of a hollow nanopillar made of crystalline silicon at operating wavelengths of 8 µm to 12 µm according to an embodiment of the present disclosure.

In some embodiments, the nanopillar 21 is the hollow nanopillar 213. For the metalens 200 in the hybrid optical system designed to operate in far-infrared waveband, the central wavelength of the far-infrared waveband is 10 μm, the hollow nanopillar 213 is made of crystalline silicon, the hollow nanopillar 213 is as shown in FIG. 2C, the height H of the hollow nanopillar 213 is 11.25 μm, and a side length of a basic element of regular hexagon is 2.76 μm. FIG. 3C shows a relationship between an optical phase of the metalens 200 and a serial number of the hollow nanopillar 213 in a case that the central wavelength of the far-infrared waveband is 10 μm. In FIG. 3C, the abscissa represents the operating wavelength (ranging from 8 μm to 12 μm), and the ordinate represents the serial number of the hollow nanopillar 213.

Figure 3D:
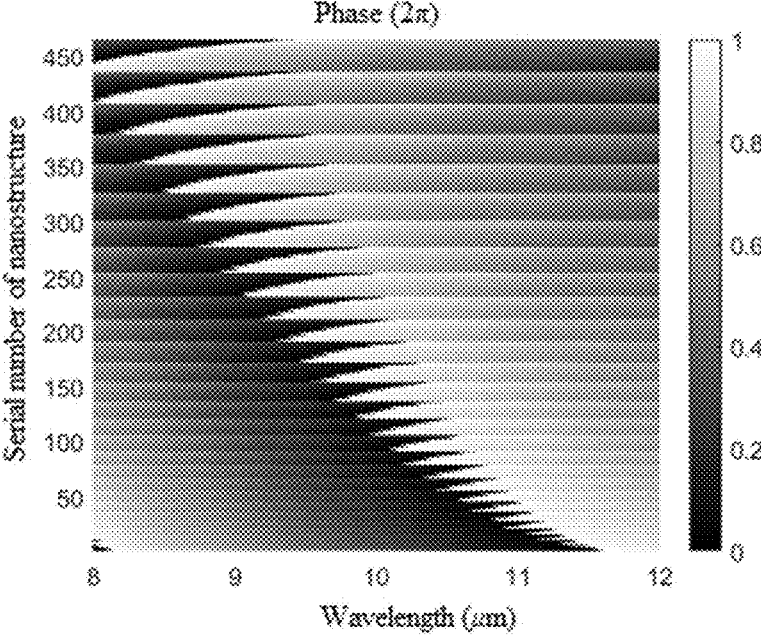
FIG. 3D is a diagram showing a relationship between an optical phase and a serial number of a negative hollow nanopillar made of crystalline silicon at operating wavelengths of 8 µm to 12 µm according to an embodiment of the present disclosure.

In some embodiments, the nanopillar 21 is the negative hollow nanopillar 214. For the metalens 200 in the hybrid optical system designed to operate in far-infrared waveband, the central wavelength of the far-infrared waveband is 10 μm, the negative hollow nanopillar 214 is made of crystalline silicon, the negative hollow nanopillar 214 is as shown in FIG. 2D, the height H of the negative hollow nanopillar 214 is 11.25 μm, and a side length of a basic element of regular hexagon is 2.76 μm. FIG. 3D shows a relationship between an optical phase of the metalens 200 and the serial number of the negative hollow nanopillar 214 in a case that the central wavelength of the far-infrared waveband is 10 μm. In FIG. 3D, the abscissa represents the operating wavelength (ranging from 8 μm to 12 μm), and the ordinate represents the serial number of the negative hollow nanopillar 214.

Figure 3E:
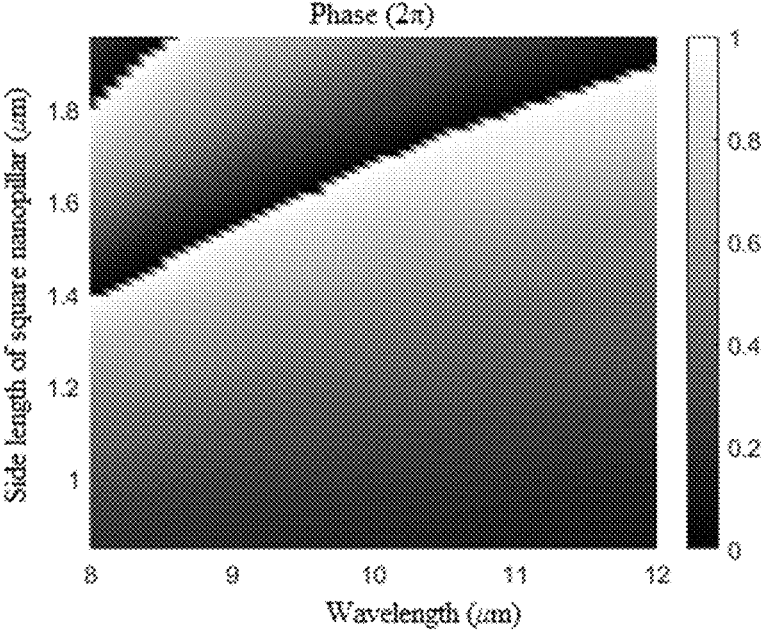
FIG. 3E is a diagram showing a relationship between an optical phase and a side length of a square nanopillar made of crystalline silicon at operating wavelengths of 8 µm to 12 µm according to an embodiment of the present disclosure.

In some embodiments, the nanopillar 21 is the square nanopillar 215. For the metalens 200 in the hybrid optical system designed to operate in far-infrared waveband, the central wavelength of the far-infrared waveband is 10 μm, the square nanopillar 215 is made of crystalline silicon, the square nanopillar 215 is as shown in FIG. 2E, the height H of the square nanopillar 215 is 11.25 μm, and a side length of a basic element of regular hexagon is 2.76 μm. FIG. 3E shows a relationship between an optical phase of the metalens 200 and a side length of the square nanopillar 215 in a case that the central wavelength of the far-infrared waveband is 10 μm. In FIG. 3E, the abscissa represents the operating wavelength (ranging from 8 μm to 12 μm), and the ordinate represents the side length of the square nanopillar 215.

Figure 3F:
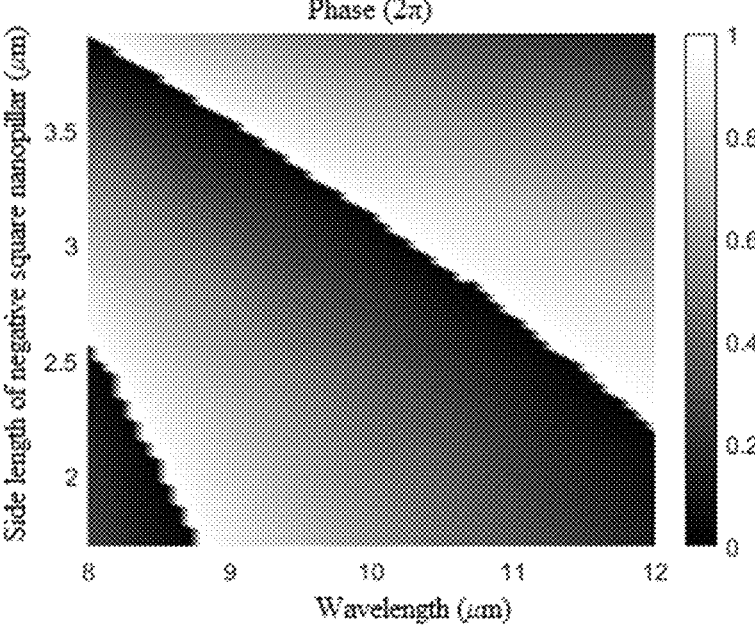
FIG. 3F is a diagram showing a relationship between an optical phase and a side length of a negative square nanopillar made of crystalline silicon at operating wavelengths of 8 µm to 12 µm according to an embodiment of the present disclosure.

In some embodiments, the nanopillar 21 is the negative square nanopillar 216. For the metalens 200 in the hybrid optical system designed to operate in far-infrared waveband, the central wavelength of the far-infrared waveband is 10 μm, the negative square nanopillar 216 is made of crystalline silicon, the negative square nanopillar 216 is as shown in FIG. 2F, the height H of the negative square nanopillar 216 is 11.25 μm, and a side length of a basic element of regular hexagon is 2.76 μm. FIG. 3F shows a relationship between an optical phase of the metalens 200 and a side length of the negative square nanopillar 216 in a case that the central wavelength of the far-infrared waveband is 10 μm. In FIG. 3F, the abscissa represents the operating wavelength (ranging from 8 μm to 12 μm), and the ordinate represents the side length of the negative square nanopillar 216.

In some embodiments, the nanopillar 21 is the hollow square nanopillar 217. For the metalens 200 in the hybrid optical system designed to operate in far-infrared waveband, the central wavelength of the far-infrared waveband is 10 μm, the hollow square nanopillar 217 is made of crystalline silicon, the hollow square nanopillar 217 is as shown in FIG.

Figure 3G:
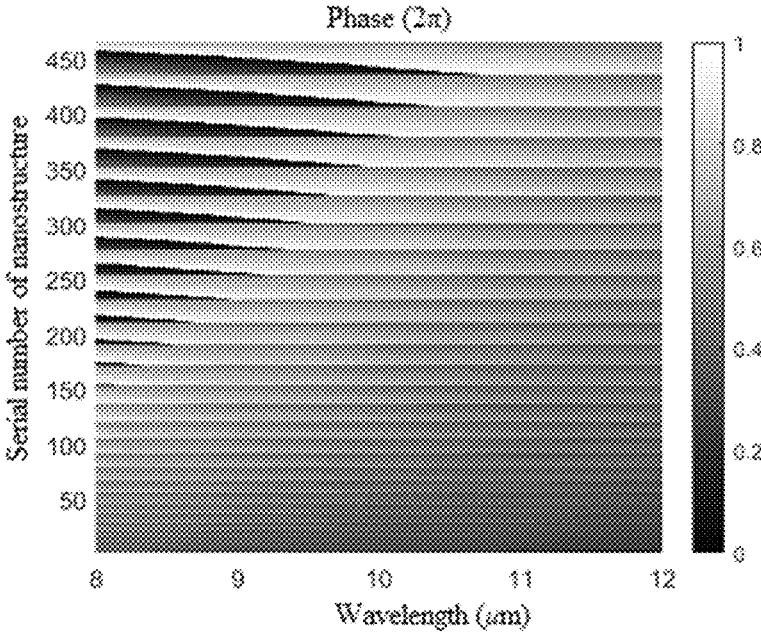
FIG. 3G is a diagram showing a relationship between an optical phase and a serial number of a hollow square nanopillar made of crystalline silicon at operating wavelengths of 8 µm to 12 µm according to an embodiment of the present disclosure.

2G, the height H of the hollow square nanopillar 217 is 11.25 μm, and a side length of a basic element of the regular hexagon is 2.76 μm. FIG. 3G shows a relationship between an optical phase of the metalens 200 and the serial number of the hollow square nanopillar 217 in a case that the central wavelength of the far-infrared waveband is 10 μm. In FIG. 3G, the abscissa represents the operating wavelength (ranging from 8 μm to 12 μm), and the ordinate represents the serial number of the hollow square nanopillar 217.

Figure 3H:
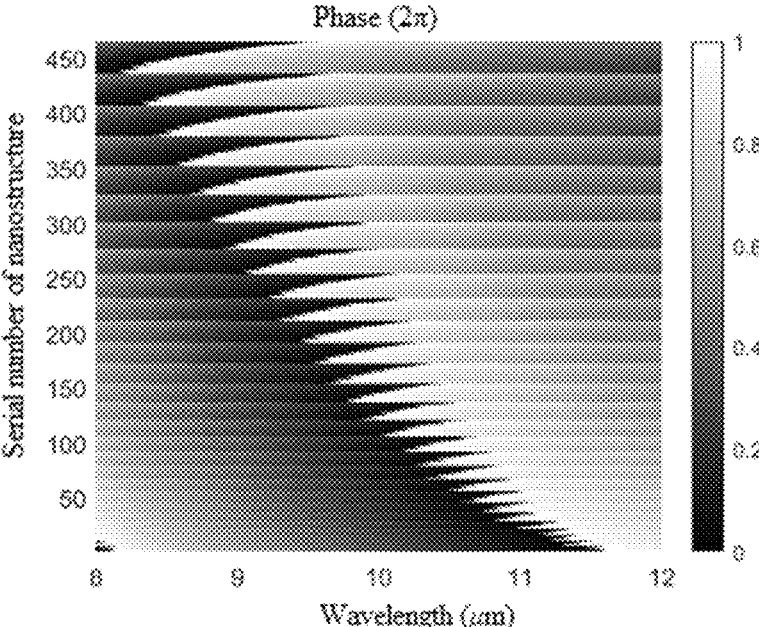
FIG. 3H is a diagram showing a relationship between an optical phase and a serial number of a negative hollow square nanopillar made of crystalline silicon at operating wavelengths of 8 µm to 12 µm according to an embodiment of the present disclosure.

In some embodiments, the nanopillar 21 is the negative hollow square nanopillar. For the metalens 200 in the hybrid optical system designed to operate in far-infrared waveband, the central wavelength of the far-infrared waveband is 10 μm, the negative hollow square nanopillar 218 is made of crystalline silicon, the negative hollow square nanopillar 218 is as shown in FIG. 2H, the height H of the negative hollow square nanopillar 218 is 11.25 μm, and a side length of a basic element of the regular hexagon is 2.76 μm. FIG. 3H shows a relationship between an optical phase of the metalens 200 and a serial number of the negative hollow square nanopillar 218 in a case that the central wavelength of the far-infrared waveband is 10 μm. In FIG. 3H, the abscissa represents the operating wavelength (ranging from 8 μm to 12 μm), and the ordinate represents the serial number of the negative hollow square nanopillar 218.

Second Embodiment

Figure 4A:
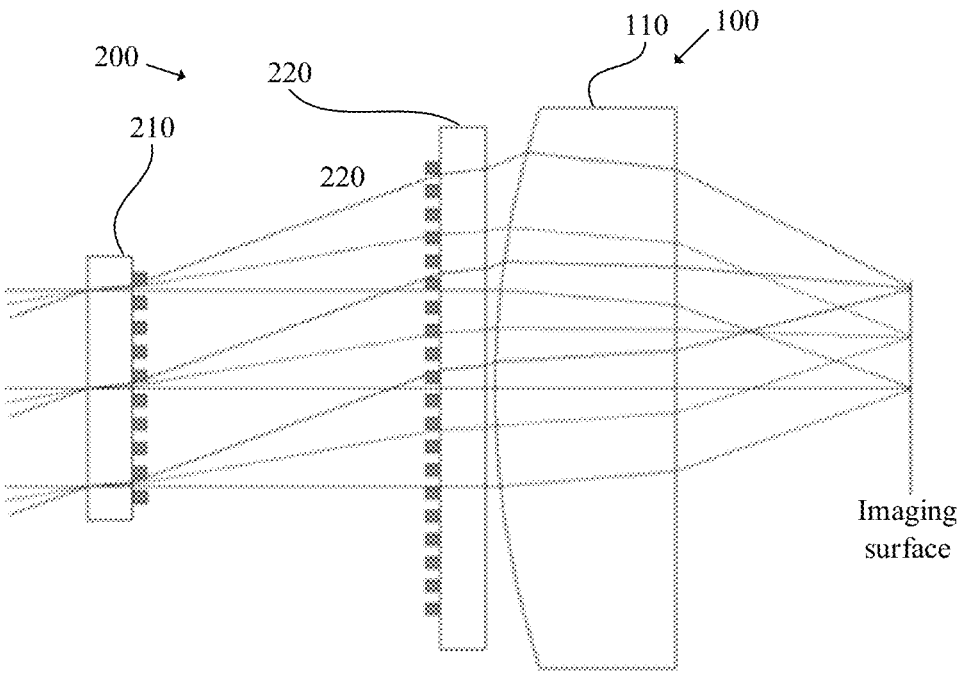
FIG. 4A is a schematic diagram of an optical system according to an embodiment of the present disclosure.
Figure 4B:
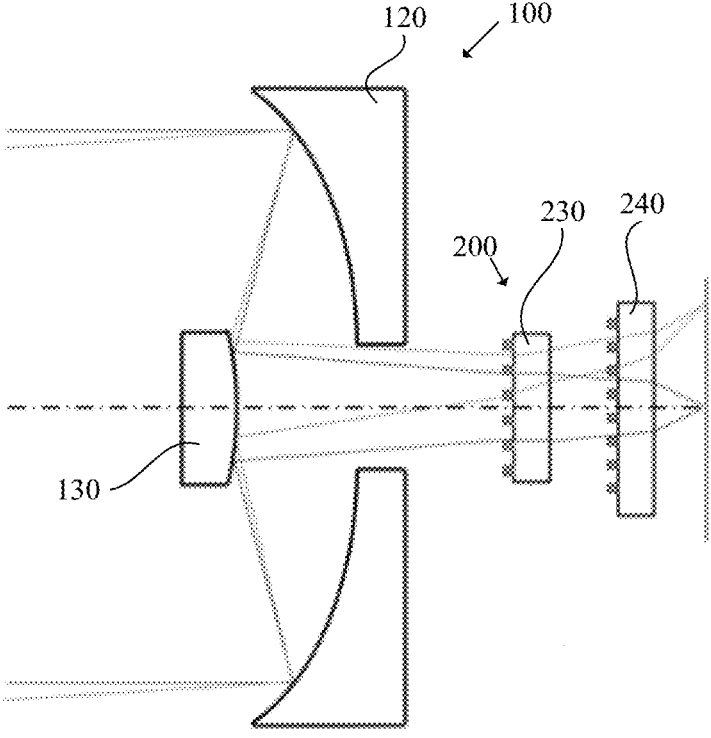
FIG. 4B is a schematic diagram of an optical system according to another embodiment of the present disclosure.

An optical system is further provided according to an embodiment of the present disclosure. As shown in FIG. 4A and FIG. 4B, the optical system may include a lens cone (not shown), a lens 100 (that is, a conventional optical lens 100, different from the metalens 200), and at least one metalens 200 according to the first embodiment. The lens 100 and the metalens 200 are coaxially arranged in the lens cone, and an optical phase of the metalens 200 is changeable at different wavelengths, so as to correct an aberration of the lens 100 at the corresponding wavelength.

In the embodiment of the present disclosure, the aberration may include at least one of a spherical aberration, a coma aberration, astigmatism, field curvature, distortion, a positional aberration and a magnification aberration. It should be understood that the aberration may also include others.

The lens 100 may include at least one of a refracting lens and a reflecting lens. For example, the lens 100 includes one refracting lens, the metalens 200 consists of two metalenses 200, and the refracting lens and the two metalenses 200 are spaced apart from each other. For example, the lens 100 includes two reflecting lenses, the metalenses 200 consists of two metalenses, and the two reflecting lenses and the two metalenses 200 are spaced apart from each other. It should be understood that the lens 100 may also be formed in other ways, and the number of the metalens 200 may also be other values.

For example, as shown in FIG. 4A, the metalens 200 includes a first metalens 210 and a second metalens 220. The second metalens 220 is arranged between the first metalens 210 and the refracting lens 110, and an interval between the first metalens 210 and the second metalens 220 is greater than an interval between the second metalens 220 and the refracting lens 110. The incident light sequentially passes through the first metalens 210 and the second metalens 220 and enters into the refracting lens 110. With such a design, the aberration of the refracting lens 110 can be corrected by the first metalens 210 and the second metalens 220, to reduce the aberration of the refracting lens 110, thereby improving the imaging quality.

To further reduce the aberration of the refracting lens 110 to improve the imaging quality, for example, a diameter of the first metalens 210 is less than a diameter of the second metalens 220, and the diameter of the second metalens 220 is roughly equal to a diameter of the refracting lens 110. For example, a surface of the first metalens 210 having the nanostructures faces a surface of the second metalens 220 having the nanostructures. The refracting lens 110 is a flat convex lens, and includes a planar surface and a spherical surface that are arranged in a manner of back to back. A surface of the second metalens 220 without nanostructures faces the spherical surface of the refracting lens 110. An operating wavelength of the optical system may range from 8 μm to 12 μm, and may also be in the visible waveband.

For example, the optical system operates in the visible waveband. In order to improve the transmissivity of the optical system shown in FIG. 4A in the visible waveband, for example, the refracting lens 110 is a convex lens 100 coated with a first antireflection coating designed for a visible waveband. A portion of a first surface of the substrate 1 of the metalens 200 without nanostructure 21 is coated with a second antireflection coating designed for the visible waveband, and an outer surface of the nanostructures 21 of the metalens 200 is coated with a third antireflection coating designed for the visible waveband. The first surface refers to a side of the substrate 1 provided with the nanostructures 21. A material of the first antireflection coating designed for the visible waveband, a material of the second antireflection coating designed for the visible waveband and a material of the third antireflection coating designed for the visible waveband may be the same or different from each other.

In an embodiment, the second antireflection coating designed for the visible waveband matches with the substrate 1 in material, so that the transmissivity of the optical system shown in FIG. 4A in the visible waveband can be improved. For example, the substrate 1 is made of quartz glass, and the second antireflection coating designed for the visible waveband matches with quartz glass in refractive index.

In an embodiment, the third antireflection coating designed for the visible waveband matches with the nanostructures 21 in refractive index, so that the transmissivity of the optical system shown in FIG. 4A in the visible waveband can be improved.

In a case that the optical system operates in the visible waveband, in an embodiment, the refracting lens 110 is made of optical glass. In an embodiment, the substrate 1 of the metalens 200 is made of quartz glass. In an embodiment, the nanostructure 21 of the metalens 200 is made of one of silicon nitride, titanium oxide, gallium nitride and silicon dioxide. It should be understood that the materials of the refracting lens 110, the substrate 1 and the metalens 200 are not limited to the materials described above, and may also be other materials.

For example, the optical system operates in the far-infrared waveband. In order to improve the transmissivity of the optical system shown in FIG. 4A in the far-infrared waveband, for example, the refracting lens 110 is a convex lens 100 coated with a first antireflection coating designed for a far-infrared waveband, a portion of a first surface of the substrate 1 of the metalens 200 without nanostructure 21 is coated with a second antireflection coating designed for the far-infrared waveband, and the top surface of the nanostructures the metalens 200 is coated with a third antireflection coating designed for the far-infrared waveband. A material of the first antireflection coating designed for the far-infrared waveband, a material of the second antireflection coating designed for the far-infrared waveband and a material of the third antireflection coating designed for the far-infrared waveband may be the same or different from each other.

In an embodiment, the second antireflection coating designed for the far-infrared waveband matches with the substrate 1 in material, so that the transmissivity of the optical system shown in FIG. 4A in the far-infrared waveband can be improved. For example, the substrate 1 is made of crystalline silicon, and the second antireflection coating designed for the visible waveband matches with crystalline silicon in refractive index.

In an embodiment, the third antireflection coating designed for the far-infrared waveband matches with the nanostructure 21 in material, so that the transmissivity of the optical system shown in FIG. 4A in the far-infrared waveband can be improved. For example, the nanostructure 21 is made of crystalline silicon, and the third antireflection coating designed for the visible waveband matches with crystalline silicon in refractive index.

For example, the substrate 1 of the metalens 200 and the nanostructure 21 of the metalens 200 are made of crystalline silicon, and the second antireflection coating designed for the far-infrared waveband and the third antireflection coating designed for the far-infrared waveband match with crystalline silicon in refractive index, so that the transmissivity of the optical system shown in FIG. 4A in the far-infrared waveband can be improved.

In a case that the optical system operates in the visible waveband, in an embodiment, the refracting lens 110 is made of one of monocrystalline germanium, zinc sulfide, zinc selenide and chalcogenide glass. In an embodiment, the substrate 1 of the metalens 200 and the nanostructure 21 of the metalens 200 are made of crystalline silicon. It should be understood that the materials of the refracting lens 110, the substrate 1 and the metalens 200 are not limited to the materials described above, and may also be other materials.

For example, as shown in FIG. 4B, the reflecting lens includes a primary reflecting lens 120 and a secondary reflecting lens 130. The metalens 200 includes a third metalens 230 and a fourth metalens 240. The primary reflecting lens 120 is arranged between the secondary reflecting lens 130 and the third metalens 230, and the primary reflecting lens 120 is spaced apart from the secondary reflecting lens 130 and the third metalens 230. The fourth metalens 240 is arranged on a side of the third metalens 230 away from the primary reflecting lens 120 and is spaced apart from the third metalens 230. The primary reflecting lens 120 includes two sub-reflecting lenses spaced apart from each other in a direction perpendicular to a third axis. Each of the two sub-reflecting lenses is a concave lens. The two sub-reflecting lenses are symmetrically arranged with respect to the third axis. The primary reflecting lens 120, the secondary reflecting lens 130, the third metalens 230 and the fourth metalens 240 are arranged coaxially with each other along the third axis. The secondary reflecting lens 130 is a convex lens. A convex surface of the secondary reflecting lens 130 faces a surface of the third metalens 230 having the nanostructures, and a surface of the fourth metalens 240 having the nanostructures faces the substrate 1 of the third metalens 230. The incident light is reflected by the concave surfaces of the sub-reflecting lenses onto the convex surface of the secondary reflecting lens 130 and is reflected by the secondary reflecting lens, and then sequentially passes through the third metalens 230 and the fourth metalens 240 and is outputted. With such a design, aberrations of the primary reflecting lens 120 and the secondary reflecting lens 130 can be corrected by the third metalens 230 and the fourth metalens 240, so that the aberrations can be reduced, thereby improving the imaging quality. To further reduce the aberrations, to improve the imaging quality, for example, a diameter of the secondary reflecting lens 130, a diameter of the third metalens 230, and an interval between the two sub-reflecting lenses are approximately equal to each other. The secondary reflecting lens 130 and the third metalens 230 are aligned between the two sub-reflecting lenses. For example, the diameter of the secondary reflecting lens 130 is less than the diameter of each sub-reflecting lens. For example, a diameter of the fourth metalens 240 is greater than the diameter of the third metalens 230.

In an embodiment, as for the third metalens 230 and the fourth metalens 240, the substrate 1 thereof and the nanostructures 21 thereof are made of crystalline silicon. In an embodiment, a portion of a first surface of each of the substrates 1 of the third metalens 230 and the fourth metalens 240 without nanostructure 21 is coated with a fourth antireflection coating designed for the far-infrared waveband, and an outer surface of the nanostructures of the third metalens 230 and the fourth metalens 240 is coated with a fifth antireflection coating designed for the far-infrared waveband, so that the transmissivity of the optical system in the far-infrared waveband can be improved. A material of the fourth antireflection coating designed for the far-infrared waveband may be the same as or different from a material of the fifth antireflection coating designed for the far-infrared waveband. Correspondingly, the primary reflecting lens and the secondary reflecting lens each may be made of any one of high reflecting materials in the infrared waveband such as gold, silver and aluminum.

It should be noted that in the embodiment of the present disclosure, the substrate 1 of the metalens 200 has a first surface having the nanostructures and another surface without nanostructures, and the first surface of the substrate has a portion which is not covered by nanostructures. The metasurface of the metalens 200 refers to the top surface of the nanostructures 21 of the metalens 200.

Figure 5A:
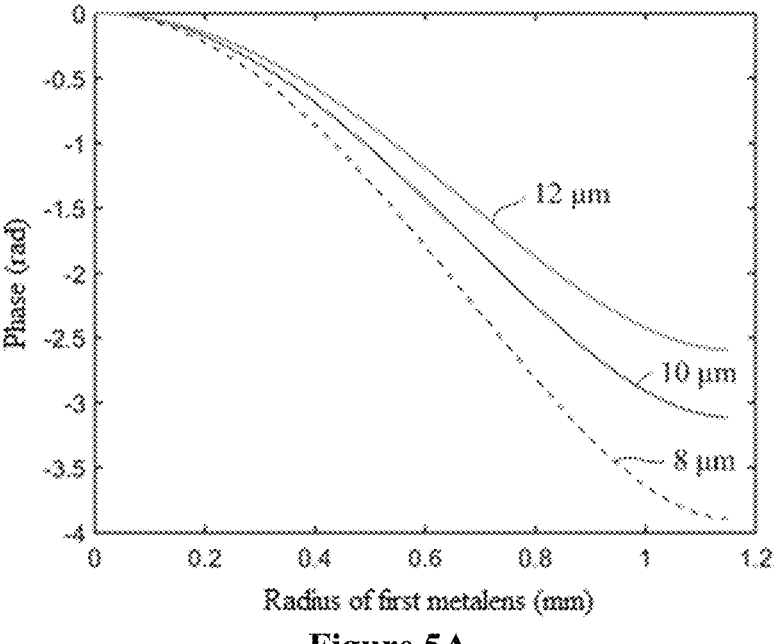
FIG. 5A is a curve graph showing relationships between an optical phase of a first metalens and a radius of the metalens in the optical system shown in FIG. 4A at operating wavelengths of 8 μm, 10 μm, and 12 μm respectively.
Figure 5B:
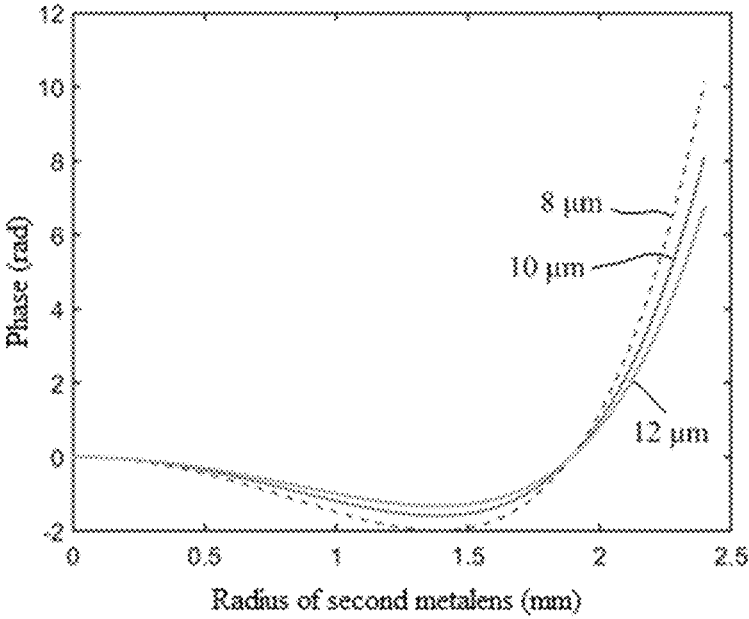
FIG. 5B is a curve graph showing relationships between an optical phase of a second metalens and a radius of the metalens in the optical system shown in FIG. 4A at operating wavelengths of 8 μm, 10 μm, and 12 μm respectively.

For example, the refracting lens 110 of the optical system shown in FIG. 4A is made of germanium. In the optical system, a full field of view is 40°, an equivalent focal length is 3.3 mm, a back focal length is 2.622 mm, F is 1.5, and an image height is 2.2 mm. The diameter of the first metalens 210 is 2.3 mm. FIG. 5A is a curve graph showing relationships between an optical phase of a first metalens 210 and a radius of a metalens 200 at operating wavelengths of 8 $\mu$m, 10 $\mu$m, and 12 $\mu$m respectively. A thickness of the first metalens 210 is 0.5 mm, and an interval between the first metalens 210 and the second metalens 220 is 3.41 mm. The diameter of the second metalens 220 is 4.9 mm. FIG. 5B is a curve graph showing relationships between an optical phase of a second metalens and a radius of a metalens 200 at operating wavelengths of 8 $\mu$m, 10 $\mu$m, and 12 $\mu$m respectively. A thickness of the second metalens 220 is 0.5 mm, and an interval between the second metalens 220 and the refracting lens 110 is 0.1 mm. The refracting lens 110 is a flat convex lens 100. A first surface of the refracting lens 110 is a spherical surface, and has a radius of 10 mm. A second surface of the refracting lens 110 is a planar surface, and has a center thickness of 2 mm. The diameter of the refracting germanium lens 100 is 5.3 mm. The optical system is designed by Matlab2019a, which is not limited thereto. Matlab2019a provides ray tracing, modulation transfer function simulation in a wide waveband and interior point optimization algorithm based on the generalized refraction law, so as to obtain the distribution of optical phase of the first metalens 210 and the second metalens 220, a curvature and a thickness of the refracting lens 110, and intervals between the three optical components of the first metalens 210, the second metalens 220 and the refracting lens 110. It should be understood that materials and thicknesses of the first metalens 210 and the second metalens 220 are determined according to the actual design, and may further be other materials and thicknesses. The material, the curvature and the thickness of the refracting lens 110 are determined according to the actual design, and may further be other materials, curvatures and thicknesses.

Figure 5C:
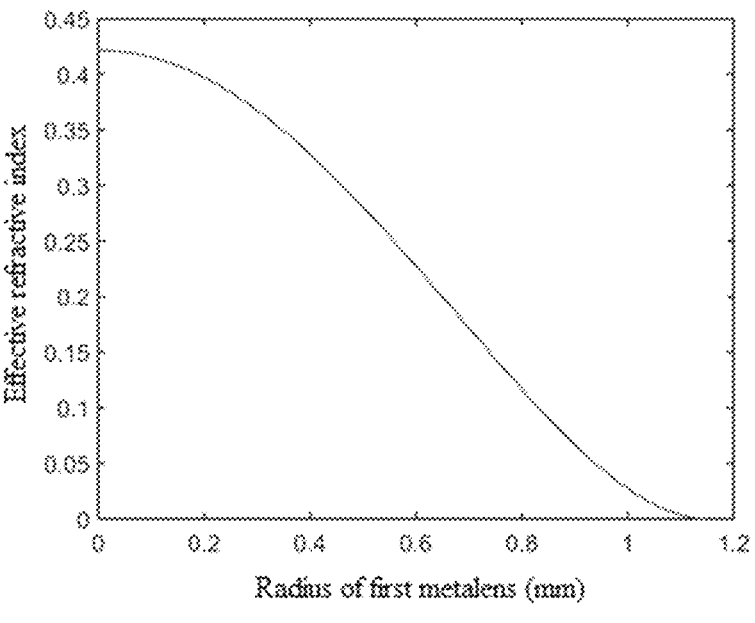
FIG. 5C is a curve graph showing relationships between an effective refractive index of a first metalens and a radius of the metalens in the optical system shown in FIG. 4A.
Figure 5D:
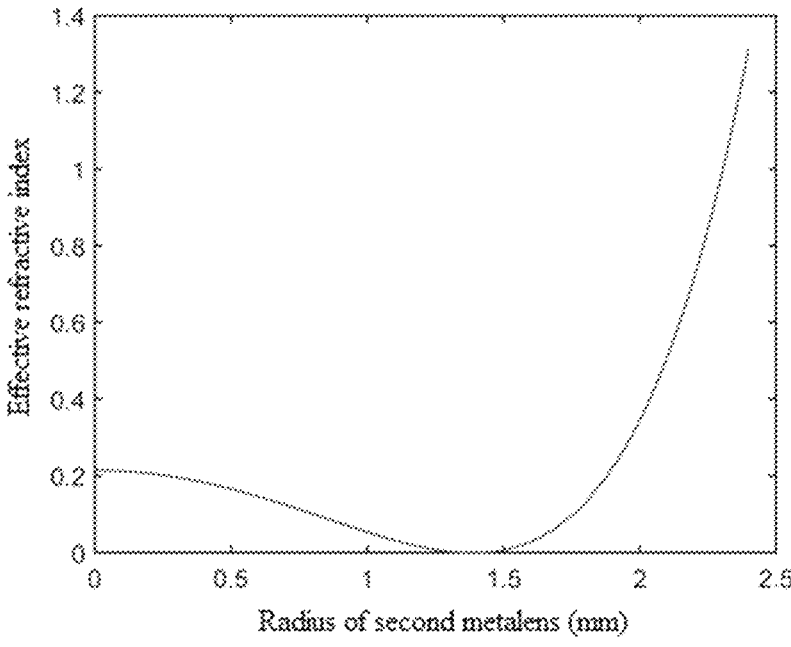
FIG. 5D is a curve graph showing relationships between an effective refractive index of a second metalens and a radius of the metalens in the optical system shown in FIG. 4A.

FIG. 5C and FIG. 5D are curve graphs respectively showing relationships between an effective refractive index of a first metalens 200 and a radius of a metalens 200 in the optical system shown in FIG. 4A, and relationships between an effective refractive index of a second metalens 200 and a radius of a metalens 200 in the optical system shown in FIG. 4A. In FIG. 5C and FIG. 5D, the abscissa represents the radius of the first metalens 210/the second metalens 220, the ordinate represents the effective refractive index of the nanostructure 21, and the effective refractive index $n_{eff}$ of the nanostructure 21 meets the following equation:

$$n_{eff} = \frac{\varphi(r, \lambda) \cdot c}{\omega \cdot H} \tag{1}$$

in the equation (1), $\varphi(r, \lambda)$ represents a phase of a metalens with a radius r and a wavelength $\lambda$; $\omega$ represents circular frequency of light; c represents speed of light, H represents the height of nanopillars; r represents a radius of the surface of the metalens 200, that is, a distance from each nanopillar to the center of the substrate 1.

Figure 5E:
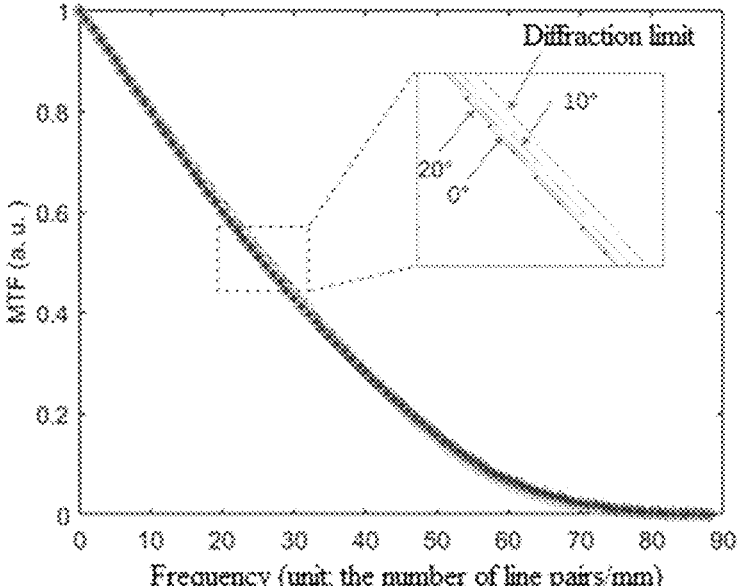
FIG. 5E is a curve graph showing a modulation transfer function at operating wavelengths of 8 μm to 12 μm in the optical system shown in FIG. 4A.

FIG. 5E is a curve graph showing a modulation transfer function in the optical system shown in FIG. 4A, in which the ordinate represents a contrast ratio, and the abscissa represents a spatial frequency (unit: the number of line pairs/mm). In FIG. 5E, the dotted line represents a curve of a modulation transfer function corresponding to a diffraction limit. The modulation transfer functions at 0°, 10° and 20° fields of view are close to the diffraction limit, which proves that the optical system shown in FIG. 4A has good imaging performance.

Figure 6A:
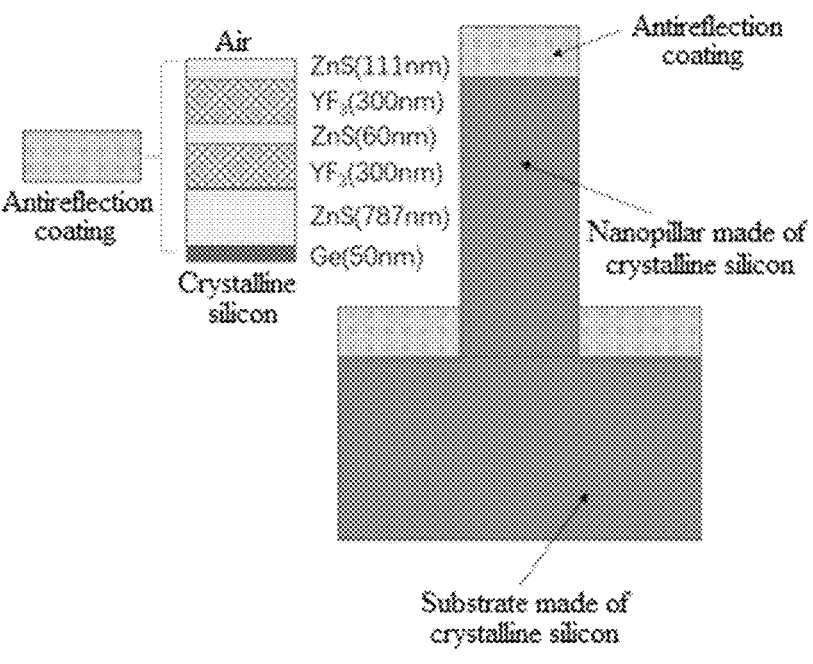
FIG. 6A is a schematic diagram showing a set of coatings and thicknesses of respective coatings on a metalens at operating wavelengths of 8 μm to 12 μm.

FIG. 6A is a schematic diagram showing laminated layers of the antireflection coatings and thicknesses of respective layers in a metalens 200 at operating wavelengths of 8 μm to 12 μm. ZnS represents zinc sulfide, YF$_3$ represents yttrium trifluoride, and Ge represents germanium. The substrate 1 of the metalens 200 and the nanopillars of the metalens 200 are made of crystalline silicon. The antireflection coating includes a first ZnS layer, a first YF$_3$ layer, a second ZnS layer, a second YF$_3$ layer, a third ZnS layer and a Ge layer that are sequentially arranged from top to bottom. The Ge layer of the antireflection coating is attached to a portion of the first surface of the substrate 1 without nanostructures and an outer surface of the nanopillar. For example, a thickness of the first ZnS layer is 111 nm, a thickness of the first YF$_3$ layer is 300 nm, a thickness of the second ZnS layer is 60 nm, a thickness of the second YF$_3$ layer is 300 nm, a thickness of the third ZnS layer is 787 nm, and a thickness of the Ge layer is 50 nm. It should be understood that the thickness of the first ZnS layer, the thickness of the first YF$_3$ layer, the thickness of the second ZnS layer, the thickness of the second YF$_3$ layer, the thickness of the third ZnS layer, and the thickness of the Ge layer may also be other values.

Figure 6B:
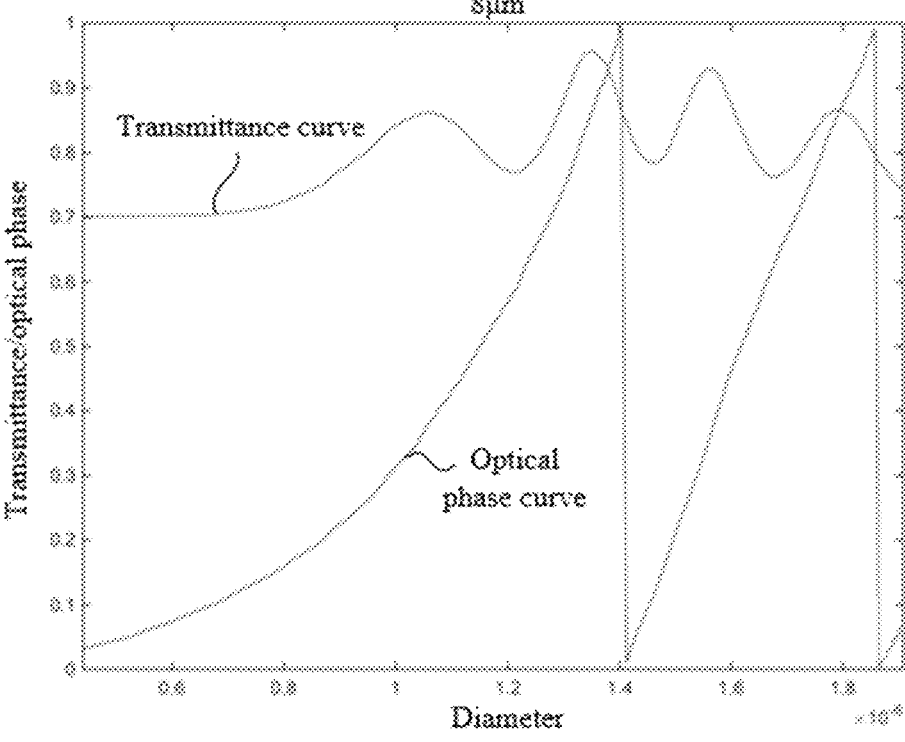
FIG. 6B is a curve graph showing a relationship between an optical phase/transmittance and a diameter of an uncoated nanopillar at an operating wavelength of 8 μm.
Figure 6C:
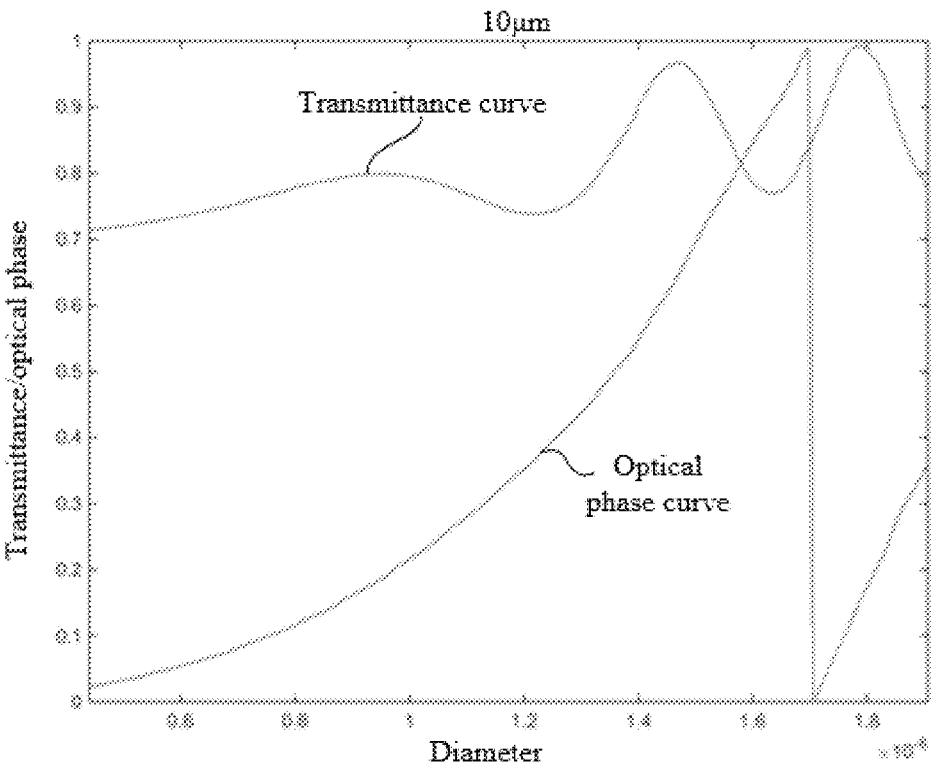
FIG. 6C is a curve graph showing a relationship between an optical phase/transmittance and a diameter of an uncoated nanopillar at an operating wavelength of 10 μm.
Figure 6D:
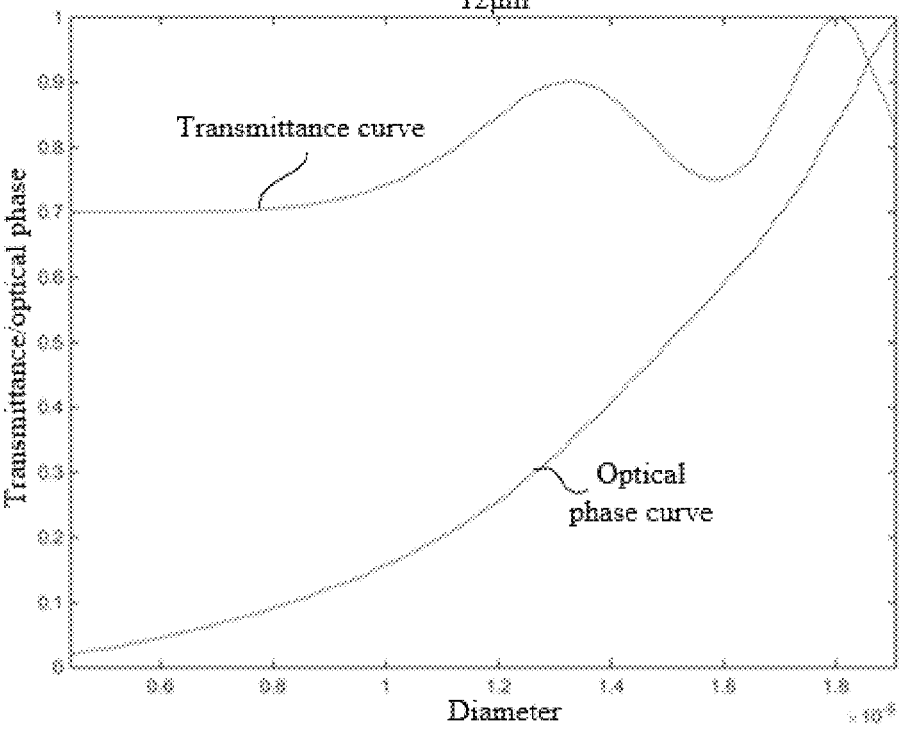
FIG. 6D is a curve graph showing a relationship between an optical phase/transmittance and a diameter of an uncoated nanopillar at an operating wavelength of 12 μm.
Figure 6E:
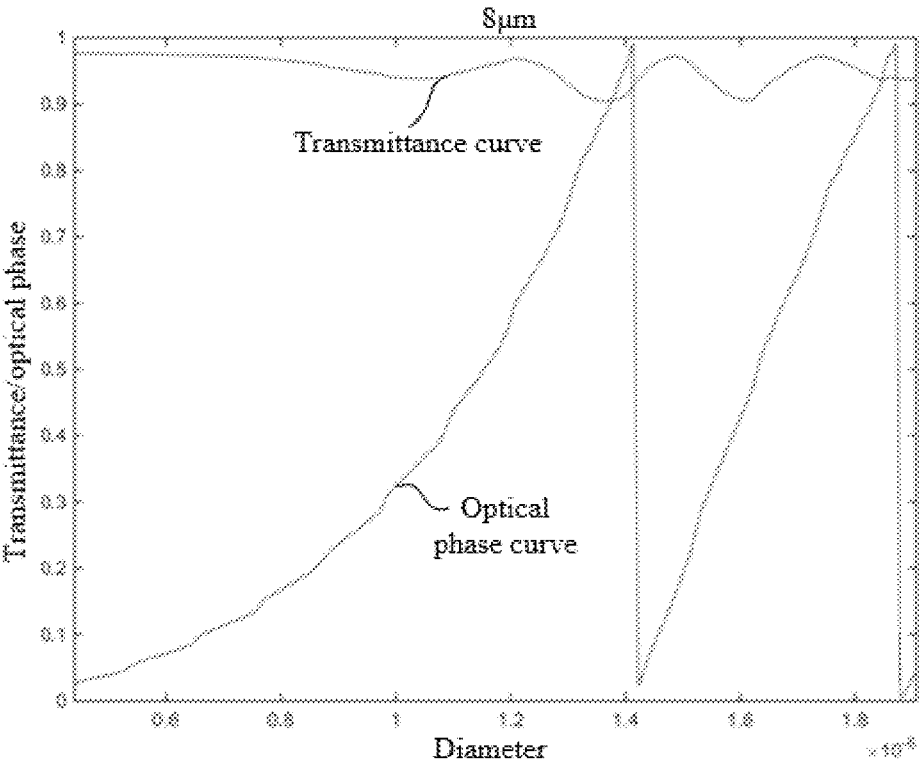
FIG. 6E is a curve graph showing a relationship between an optical phase/transmittance and a diameter of a nanopillar coated with an antireflection coating shown in FIG. 6A at an operating wavelength of 8 μm.
Figure 6F:
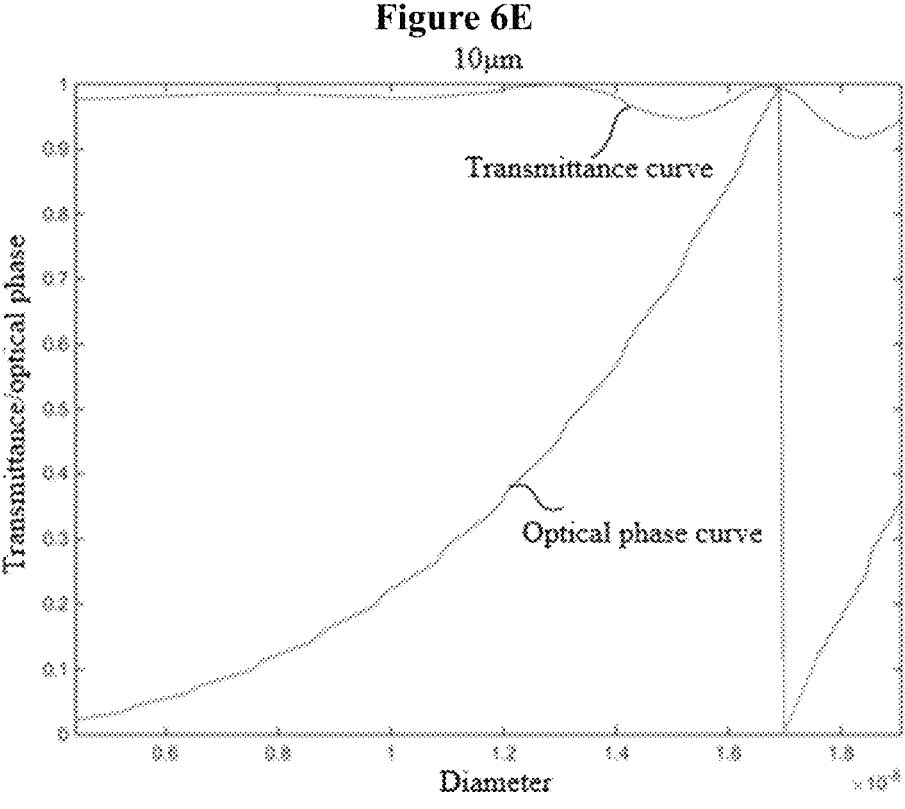
FIG. 6F is a curve graph showing a relationship between an optical phase/transmittance and a diameter of a nanopillar coated with an antireflection coating shown in FIG. 6A at an operating wavelength of 10 μm.
Figure 6G:
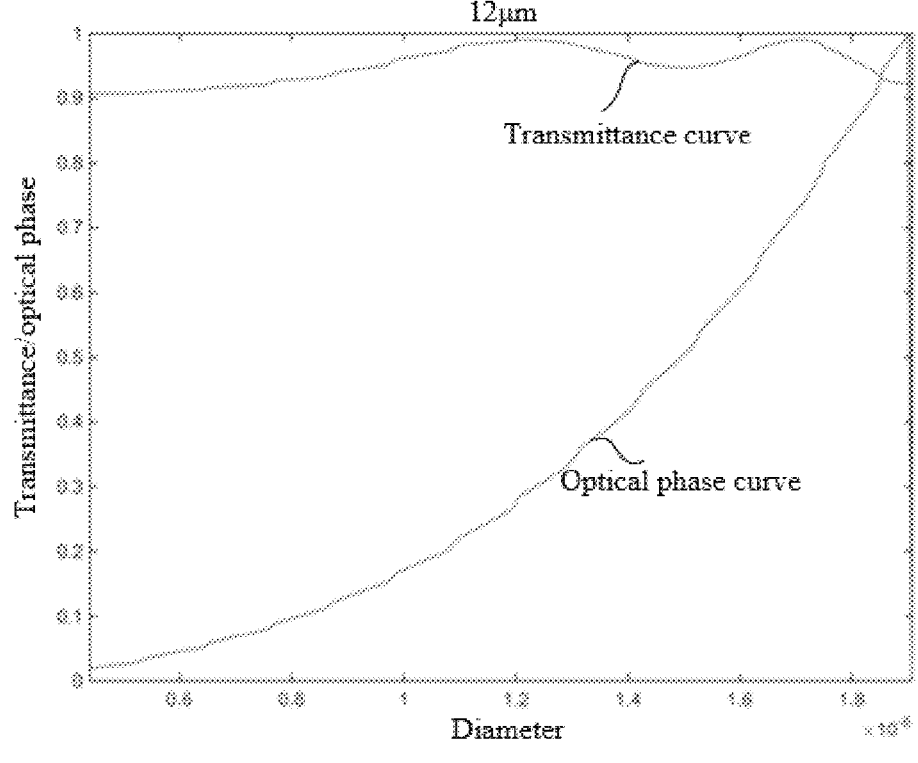
FIG. 6G is a curve graph showing a relationship between an optical phase/transmittance and a diameter of a nanopillar coated with an antireflection coating shown in FIG. 6A at an operating wavelength of 12 μm.

FIG. 6B, FIG. 6C and FIG. 6D respectively show relationships between an optical phase/transmittance and a diameter of an uncoated positive nanopillar 211 shown in FIG. 2A at operating wavelengths of 8 μm, 10 μm, and 12 μm respectively. Average transmittances of the positive nanopillar 211 at 8 μm, 10 μm and 12 μm respectively are 86.3%, 87.4% and 79.3%. FIG. 6E, FIG. 6F, and FIG. 6G respectively show relationships between an optical phase/transmittance and a diameter of a positive nanopillar 211 coated with an antireflection coating shown in FIG. 2A at an operating wavelength of 8 μm, 10 μm, and 12 μm. Average transmittances of the positive nanopillar 211 at 8 μm, 10 μm and 12 μm are 98%, 95.8% and 96% respectively. Compared with the uncoated positive nanopillar 211, the transmittance of the positive nanopillar 211 coated with the antireflection coating is significantly improved.

Figure 7:
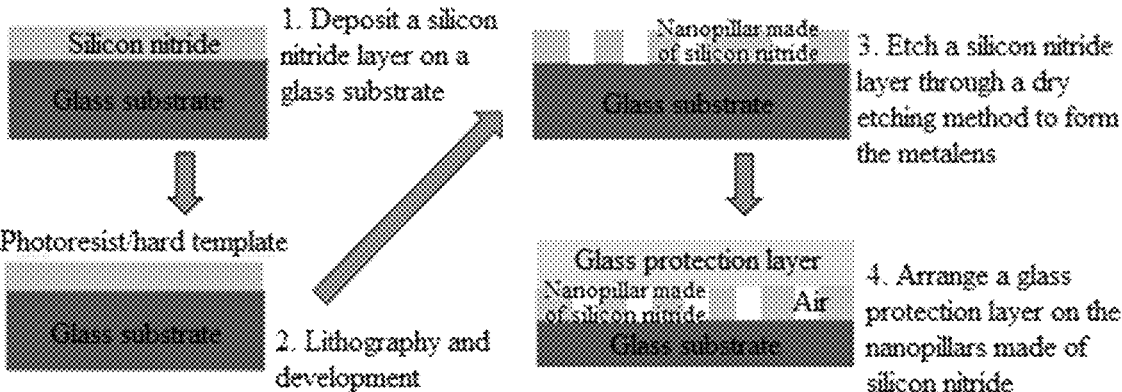
FIG. 7 is a schematic flow chart of a photolithography process according to an embodiment of the present disclosure.

FIG. 7 is a flow chart of a process for fabricating nanopillars by photolithography, and the process includes the following steps 1 to 4.

In step 1, a nanopillar material layer, such as silicon nitride is deposited on a glass substrate.

In step 2, photoresist is coated on silicon nitride, followed by exposure in a lithography machine and ensuing development.

In step 3, a silicon nitride layer is etched through a dry etching method to form the metalens 200.

In step 4, a glass protection layer is arranged on the nanopillars made of silicon nitride.

Figure 8:
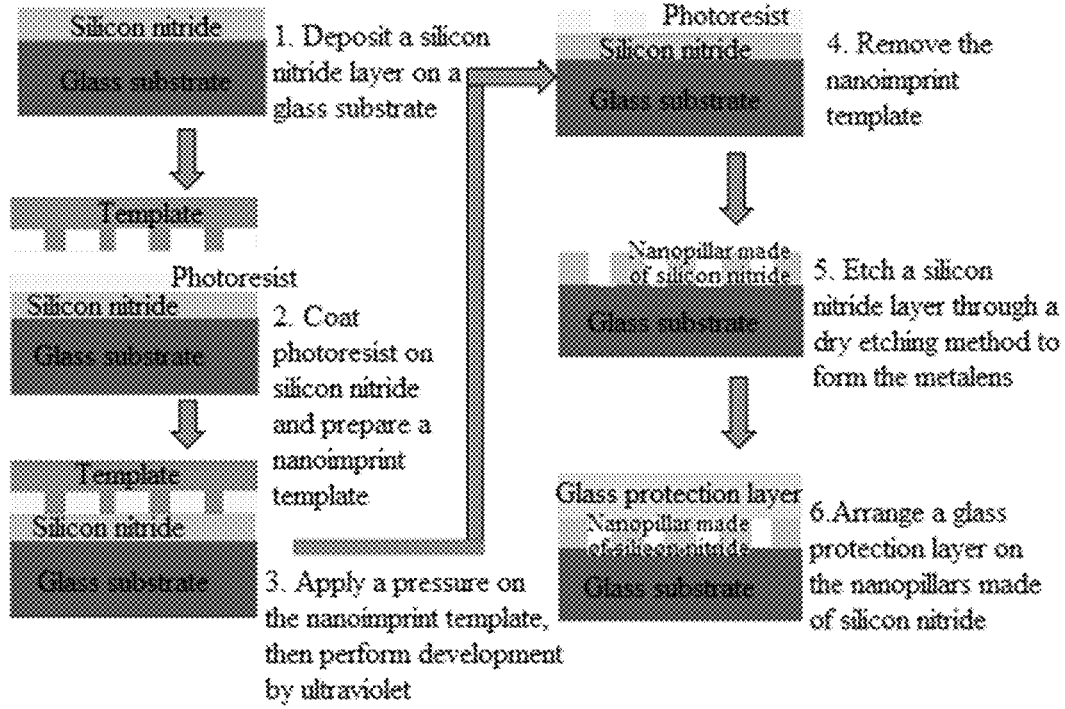
FIG. 8 is a schematic flow chart of a nanoimprint process according to an embodiment of the present disclosure.

FIG. 8 is a flow chart of a process for fabricating nanopillars by nanoimprint, and the process includes the following steps 1 to 6.

In step 1, a nanopillar material layer, such as silicon nitride is deposited on a glass substrate.

In step 2, photoresist is coated on silicon nitride and a nanoimprint template is prepared.

In step 3, a pressure is applied on the nanoimprint template by an imprinter, and then development is performed by ultraviolet.

In step 4, the nanoimprint template is removed, followed by washing off residual photoresist.

In step 5, a silicon nitride layer is etched by a dry etching method to form the metalens 200.

In step 6, a glass protection layer is arranged on the nanopillars made of silicon nitride.

The above embodiments are only used for illustrating the technical solutions of the present disclosure, and are not intended to limit the present disclosure. Although the present disclosure is illustrated in detail with reference to the embodiments described above, it should be understood by those skilled in the art that modification can be made to the technical solutions recited in the embodiments described above, or equivalent substitution can be made onto a part of technical features of the technical solution. The modifications and equivalent replacements will not make the corresponding technical solutions deviate from the scope of technical solutions of the embodiments of the present disclosure.

The invention claimed is:

1. An optical system, comprising:
   a lens cone;
   a lens, comprising two reflecting lenses; and
   two metalenses, wherein the lens and the two metalenses are coaxially arranged in the lens cone, and an optical phase of the two metalenses is changeable at different wavelengths, to correct an aberration of the lens at a corresponding wavelength;

wherein the two reflecting lenses and the two metalenses are spaced apart from each other.

2. The optical system according to claim 1, wherein the aberration comprises at least one of a spherical aberration, a coma aberration, astigmatism, field curvature, distortion, a positional aberration and a magnification aberration.

3. The optical system according to claim 2, wherein the lens comprises at least one of a refracting lens and a reflecting lens.

4. The optical system according to claim 1, wherein the lens comprises one refracting lens, and the refracting lens and the two metalenses are spaced apart from each other.

5. The optical system according to claim 4, wherein a first of the two metalenses comprises a first metalens and wherein a second of the two metalenses comprises a second metalens; the second metalens is arranged between the first metalens and the refracting lens; and an incident light is configured to sequentially pass through the first metalens and the second metalens and enter into the refracting lens.

6. The optical system according to claim 4, wherein the refracting lens is a convex lens coated with a first antireflection coating designed for a visible waveband; a substrate of a metalens of the two metalenses comprises a first surface and the nanostructures are arranged on the first surface; a portion of the first surface without nanostructure is coated with a second antireflection coating designed for the visible waveband, an outer surface of the nanostructures of the metalens is coated with a third antireflection coating designed for the visible waveband.

7. The optical system according to claim 6, wherein
the second antireflection coating designed for the visible waveband is configured to match with quartz glass in refractive index; and
the third antireflection coating designed for the visible waveband is configured to match with the nanostructures in refractive index.

8. The optical system according to claim 6, wherein the refracting lens is made of optical glass;
the substrate of the metalens is made of quartz glass; and
the nanostructures of the metalens are made of one of silicon nitride, titanium oxide, gallium nitride and silicon dioxide.

9. The optical system according to claim 6, wherein the refracting lens is made of optical glass;
the substrate of the metalens is made of quartz glass; or
the nanostructures of the metalens are made of one of silicon nitride, titanium oxide, gallium nitride and silicon dioxide.

10. The optical system according to claim 6, wherein
the second antireflection coating designed for the visible waveband is configured to match with quartz glass in refractive index; or
the third antireflection coating designed for the visible waveband is configured to match with the nanostructures in refractive index.

11. The optical system according to claim 4, wherein
the refracting lens is a convex lens coated with a first antireflection coating designed for a far-infrared waveband, a substrate of a metalens of the two metalenses comprises a first surface and the nanostructures are arranged on the first surface; a portion of the first surface without nanostructure is coated with a second antireflection coating designed for the far-infrared waveband, and a metasurface of the metalens is coated with a third antireflection coating designed for the far-infrared waveband.

12. The optical system according to claim 11, wherein
the refracting lens is made of one of monocrystalline germanium, zinc sulfide, zinc selenide and chalcogenide glass; and
the substrate and the nanostructures of the metalens are made of crystalline silicon.

13. The optical system according to claim 11, wherein the second antireflection coating designed for the far-infrared waveband, and the third antireflection coating designed for the far-infrared waveband both are configured to match with crystalline silicon in refractive index.

14. The optical system according to claim 11, wherein
the refracting lens is made of one of monocrystalline germanium, zinc sulfide, zinc selenide and chalcogenide glass; or
the substrate and the nanostructures of the metalens are made of crystalline silicon.

15. The optical system according to claim 1, wherein the two reflecting lenses comprise a primary reflecting lens and a secondary reflecting lens, and further comprising a third metalens and a fourth metalens, wherein
the primary reflecting lens is arranged between the secondary reflecting lens and the third metalens, and the primary reflecting lens is spaced apart from the secondary reflecting lens and the third metalens; the fourth metalens is spaced apart from the third metalens and is arranged on a side of the third metalens away from the primary reflecting lens;
the primary reflecting lens comprises two sub-reflecting lenses spaced apart from each other in a direction perpendicular to a third axis; each of the two sub-reflecting lenses is a concave lens; the two sub-reflecting lenses are symmetrically arranged with respect to the third axis; and the primary reflecting lens, the secondary reflecting lens, the third metalens and the fourth metalens are arranged coaxially with each other along the third axis;
the secondary reflecting lens is a convex lens; concave surfaces of the two sub-reflecting lenses are configured to face a convex surface of the secondary reflecting lens; the convex surface of the secondary reflecting lens is configured to face a surface of the third metalens having the nanostructures; and a surface of the fourth metalens having the nanostructures is configured to face a substrate of the third metalens; and
incident light is reflected by the concave surfaces of the two sub-reflecting lenses onto the convex surface of the secondary reflecting lens and is reflected by the secondary reflecting lens, then sequentially passes through the third metalens and the fourth metalens and is outputted.

16. The optical system according to claim 4, wherein a metalens of the two meta lenses comprises:
a substrate, configured to transmit light of different wavebands comprising visible light and infrared light; and
a plurality of metasurface structure units arranged on one surface of the substrate, wherein the metasurface structure units are arranged in an array, each of the metasurface structure units is regular hexagonal or square; the metalens comprises a plurality of nanostructures, and each of the nanostructures is arranged at a center of each metasurface structure unit, or each of the center and vertexes of each metasurface structure unit is provided with one nanostructure; wherein
the nanostructures are symmetrically arranged with respect to a first axis and a second axis, respectively, and partial nanostructures obtained by dividing the nanostructures on the metalens along the first axis and the second axis are identical to each other, wherein the first axis is perpendicular to the second axis, and the first axis and the second axis are both perpendicular to a height direction of the nanostructures; and optical phases of the nanostructures at different positions are different at respective wavelengths; for the respective wavelengths, difference of the optical phases of the nanostructures at the different positions is configured to determine optical phase distribution of the metalens.

17. The optical system according to claim 16, wherein each of the nanostructures is a nanopillar, and the nanopillar is a negative hollow nanopillar, a square nanopillar, a negative square nanopillar, a hollow square nanopillar, a negative hollow square nanopillar or a topological nanopillar.

18. The optical system according to claim 17, wherein each of the nanostructures is variable in optical phase when a height of the nanopillar, a shape of a cross section of the nanopillar and a material of the nanopillar changes, wherein the cross section is parallel to the substrate.

19. The optical system according to claim 18, wherein the nanostructures are made of one of following materials: photoresist, quartz glass, silicon nitride, titanium oxide, crystalline silicon, amorphous silicon, and gallium nitride.

\* \* \* \* \*